US012669577B2

(12) United States Patent
Rimini et al.

(10) Patent No.: US 12,669,577 B2
(45) Date of Patent: Jun. 30, 2026

(54) PRECODING RADAR RECEIVE SIGNALS

(71) Applicant: Qualcomm Incorporated, San Diego, CA (US)

(72) Inventors: Roberto Rimini, San Diego, CA (US); Anant Gupta, San Diego, CA (US); Adrian Bortier Alabi, San Diego, CA (US); Ravi Teja Yarra, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 365 days.

(21) Appl. No.: 18/338,213

(22) Filed: Jun. 20, 2023

(65) Prior Publication Data

US 2024/0426976 A1     Dec. 26, 2024

(51) Int. Cl.
G01S 7/35          (2006.01)
G01S 7/00          (2006.01)

(52) U.S. Cl.
CPC .............. G01S 7/354 (2013.01); G01S 7/006 (2013.01)

(58) Field of Classification Search
CPC ...... G01S 7/023; G01S 7/0234; G01S 7/0233; G01S 7/0236; G01S 7/006; G01S 13/354
USPC ........................................ 342/189
See application file for complete search history.

(56) References Cited

U.S. PATENT DOCUMENTS

| | | | | |
|---|---|---|---|---|
| 2,788,788 | A * | 4/1957 | Solomon | A45D 2/10 132/245 |
| 8,928,866 | B2 * | 1/2015 | Ueno | G01S 17/34 356/25 |

| | | | | |
|---|---|---|---|---|
| 9,182,476 | B2 * | 11/2015 | Wintermantel | G01S 7/023 |
| 10,812,154 | B1 * | 10/2020 | Elad | G01S 13/42 |
| 11,346,932 | B1 * | 5/2022 | Millar | G01S 17/89 |
| 11,486,994 | B2 * | 11/2022 | Kishigami | G01S 7/4026 |

(Continued)

FOREIGN PATENT DOCUMENTS

| | | |
|---|---|---|
| EP | 2788788 B1 | 2/2018 |
| EP | 4163664 A1 | 4/2023 |

OTHER PUBLICATIONS

International Search Report and Written Opinion—PCT/US2024/032848—ISA/EPO—Oct. 1, 2024.

(Continued)

*Primary Examiner* — Michael W Justice
(74) *Attorney, Agent, or Firm* — Smith Tempel Blaha LLC/Qualcomm

(57)          ABSTRACT

An apparatus for is disclosed for precoding radar receive signals. The apparatus includes a wireless transceiver configured to transmit a radar transmit signal using at least one antenna. The radar transmit signal is modulated in frequency across multiple cycles based on one or more frequency-modulation schemes. The wireless transceiver is also configured to receive at least two radar receive signals using at least two other antennas. The at least two radar receive signals include versions of the radar transmit signal that are reflected by at least one object. Each of the at least two radar receive signals is modulated in frequency across the multiple cycles based on the one or more frequency-modulation schemes of the radar transmit signal. The wireless transceiver is further configured to precode the at least two radar receive signals across the multiple cycles to generate precoded radar receive signals that are orthogonal to each other.

22 Claims, 10 Drawing Sheets

(56)          References Cited

U.S. PATENT DOCUMENTS

| 11,579,244 | B2 * | 2/2023 | Rimini | H04Q 11/04 |
| 12,019,145 | B2 * | 6/2024 | Kishigami | G01S 13/288 |
| 12,078,746 | B2 * | 9/2024 | Kishigami | H01Q 21/065 |
| 12,386,028 | B2 * | 8/2025 | Kishigami | G01S 13/42 |
| 2012/0170672 | A1 * | 7/2012 | Sondur | H04B 7/0697 |
| | | | | 375/260 |
| 2012/0215484 | A1 * | 8/2012 | Ueno | G01S 17/58 |
| | | | | 702/142 |
| 2018/0149466 | A1 * | 5/2018 | Floyd | G01S 13/90 |
| 2020/0103515 | A1 * | 4/2020 | Kishigami | G01S 13/343 |
| 2021/0156954 | A1 * | 5/2021 | Rimini | H04Q 11/04 |
| 2022/0120849 | A1 * | 4/2022 | Kishigami | G01S 7/032 |
| 2022/0164924 | A1 * | 5/2022 | Millar | G01S 17/26 |
| 2022/0171048 | A1 * | 6/2022 | Kishigami | G01S 7/0233 |
| 2022/0187440 | A1 * | 6/2022 | Kishigami | G01S 13/582 |
| 2023/0003870 | A1 * | 1/2023 | Kishigami | G01S 13/34 |
| 2023/0104290 | A1 * | 4/2023 | Li | G01S 13/26 |
| | | | | 342/189 |

OTHER PUBLICATIONS

Zhang S-S., et al., "Calculation of Beamforming for the HF Radar with the Two-element Crossed-loop/monopole Antenna Array", Journal of Electromagnetic Waves and Applications, vol. 28, No. 5, Mar. 24, 2014, pp. 641-654, XP093206254, Chapter 2.1.

\* cited by examiner

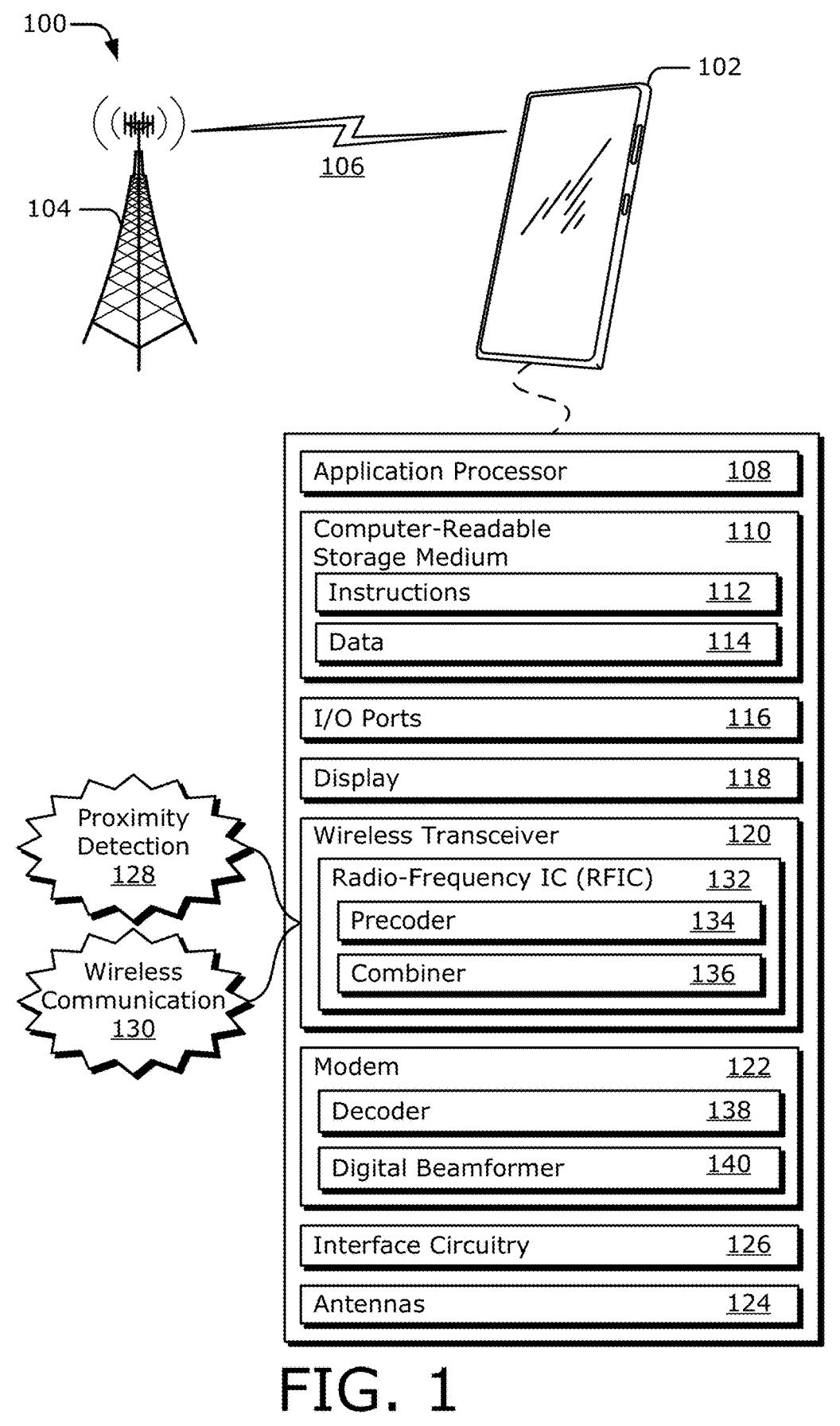

100

102

106

104

| Application Processor | 108 |
|---|---|

| Computer-Readable Storage Medium | 110 |
|---|---|
| Instructions | 112 |
| Data | 114 |

| I/O Ports | 116 |
|---|---|

| Display | 118 |
|---|---|

| Wireless Transceiver | 120 |
|---|---|
| Radio-Frequency IC (RFIC) | 132 |
| Precoder | 134 |
| Combiner | 136 |

| Modem | 122 |
|---|---|
| Decoder | 138 |
| Digital Beamformer | 140 |

| Interface Circuitry | 126 |
|---|---|

| Antennas | 124 |
|---|---|

Proximity Detection 128

Wireless Communication 130

FIG. 1

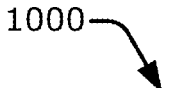

1000

Transmit a radar transmit signal using at least
one antenna, the radar transmit signal modulated
in frequency across multiple cycles based on
one or more frequency-modulation schemes
1002

Receive at least two radar receive signals using at least
two other antennas, the at least two radar receive signals
comprising versions of the radar transmit signal that are
reflected by at least one object, each of the at least two
radar receive signals modulated in frequency across the
multiple cycles based on the one or more frequency-
modulation schemes of the radar transmit signal
1004

Precoding the at least two radar receive signals across
the multiple cycles to generate precoded radar
receive signals that are orthogonal to each other
1006

FIG. 10

PRECODING RADAR RECEIVE SIGNALS

TECHNICAL FIELD

This disclosure relates generally to wireless transceivers and, more specifically, to a wireless transceiver for receiving radar signals.

BACKGROUND

To increase transmission rates and throughput, cellular and other wireless networks are using signals with higher frequencies and smaller wavelengths. As an example, 5th or 6th generation (5G or 6G)-capable devices communicate with networks using frequencies that include those at or near the extremely-high frequency (EHF) spectrum (e.g., frequencies greater than 25 gigahertz (GHz)) with wavelengths at or near millimeter wavelengths. These signals have various technological challenges, such as higher path loss as compared to signals for earlier generations of wireless communications. In certain scenarios it can be difficult for a 5G or 6G wireless signal to travel far enough to make cellular communications feasible at these higher frequencies.

Transmit power levels can be increased or transmit beamforming can concentrate energy in a particular direction to compensate for the higher path loss. These types of compensation techniques, however, increase power densities. The Federal Communications Commission (FCC) has determined a maximum permitted exposure (MPE) limit to accommodate these higher power densities. To meet targeted guidelines based on this MPE limit, devices balance performance with transmission power and other considerations. This balancing act can be challenging to realize given cost, size, functional design objectives and/or involved constraints. Further, transmit beams may be steered around obstructions that may otherwise introduce additional loss.

SUMMARY

An apparatus is disclosed that implements techniques of precoding radar receive signals. In an example implementation, a wireless transceiver performs orthogonal precoding on the radar receive signals to enable angular information about an object to be preserved prior to combining the radar receive signals together for propagation across a resource-constrained interface. In some implementations, the precoding of the radar receive signals can be performed using existing components, such as phase shifters. By preserving this information across the resource-constrained interface, an angular position of the object can be measured downstream using digital beamforming techniques. The angular position of the object can be used to improve beam management operation and optimize coverage for wireless communication. Additionally or alternatively, the angular position of the object can be used to meet safety guidelines promulgated by the government or the wireless industry, such as the Maximum Permitted Exposure (MPE) limit as determined by the Federal Communications Commission (FCC).

In an example aspect, an apparatus is disclosed. The apparatus includes a wireless transceiver configured to be coupled to at least three antennas. The wireless transceiver is also configured to transmit a radar transmit signal using at least one antenna of the at least three antennas. The radar transmit signal is modulated in frequency across multiple cycles based on one or more frequency-modulation schemes. The wireless transceiver is further configured to receive at least two radar receive signals using at least two other antennas of the at least three antennas. The at least two radar receive signals include versions of the radar transmit signal that are reflected by at least one object. Each of the at least two radar receive signals is modulated in frequency across the multiple cycles based on the one or more frequency-modulation schemes of the radar transmit signal. The wireless transceiver is also configured to precode the at least two radar receive signals across the multiple cycles to generate precoded radar receive signals that are orthogonal to each other.

In an example aspect, a method for precoding radar receive signals is disclosed. The method includes transmitting a radar transmit signal using at least one antenna. The radar transmit signal is modulated in frequency across multiple cycles based on one or more frequency-modulation schemes. The method also includes receiving at least two radar receive signals using at least two other antennas. The at least two radar receive signals include versions of the radar transmit signal that are reflected by at least one object. Each of the at least two radar receive signals is modulated in frequency across the multiple cycles based on the one or more frequency-modulation schemes of the radar transmit signal. The method further includes precoding the at least two radar receive signals across the multiple cycles to generate precoded radar receive signals that are orthogonal to each other.

In an example aspect, an apparatus is disclosed. The apparatus includes means for transmitting a radar transmit signal. The radar transmit signal is modulated in frequency across multiple cycles based on one or more frequency-modulation schemes. The apparatus also includes means for receiving at least two radar receive signals representing versions of the radar transmit signal that are reflected by at least one object. Each of the at least two radar receive signals is modulated in frequency across the multiple cycles based on the one or more frequency-modulation schemes of the radar transmit signal. The apparatus further includes means for precoding the at least two radar receive signals across the multiple cycles to generate precoded radar receive signals that are orthogonal to each other.

In an example aspect, a radio-frequency integrated circuit is disclosed. The radio-frequency integrated circuit is configured to be coupled to multiple antennas. The radio-frequency integrated circuit is also configured to receive multiple radar receive signals via the multiple antennas. Each of the at least two radar receive signals is modulated in frequency across the multiple cycles based on the one or more frequency-modulation schemes. The radio-frequency integrated circuit includes multiple phase shifters and at least one combiner. The multiple phase shifters are configured to apply multiple phase shifts across the multiple cycles of the multiple radar receive signals to generate precoded radar receive signals that are orthogonal to each other. The at least one combiner is configured to be coupled between the multiple phase shifters and a mixer. The at least one combiner is also configured to generate a composite radar receive signal based on the precoded radar receive signals.

BRIEF DESCRIPTION OF DRAWINGS

FIG. 1 illustrates an example operating environment for precoding radar receive signals.

FIG. 10 is a flow diagram illustrating an example process for precoding radar receive signals.

DETAILED DESCRIPTION

Figure 2:
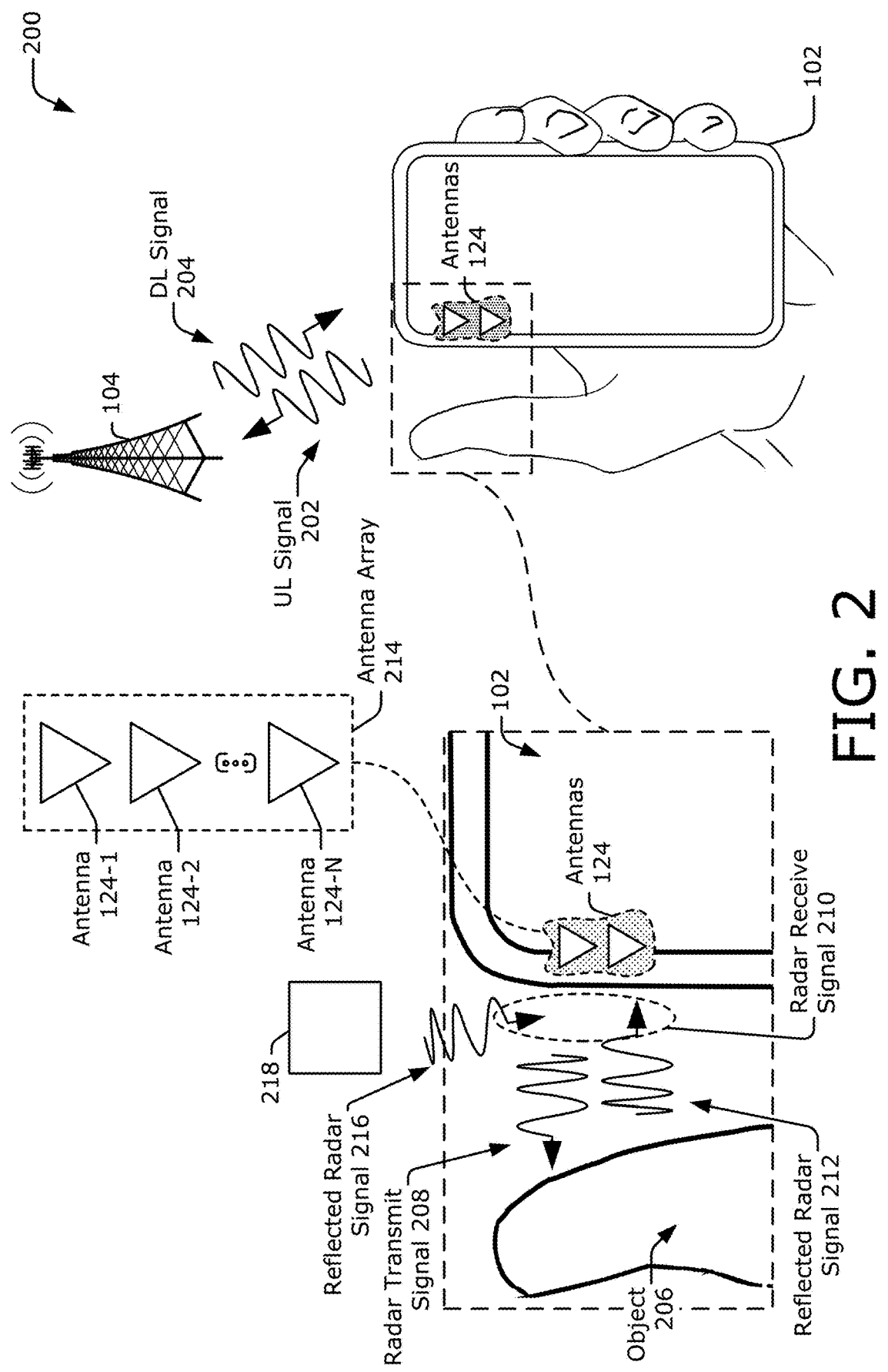
FIG. 2 illustrates an example operating environment for proximity detection that includes precoding radar receive signals.

Current high-frequency and small-wavelength communications can balance performance in the presence of challenging environmental condition. In general, higher frequency signals are more susceptible to multipath fading, scattering, atmospheric absorption, diffraction, and interference relative to lower frequency signals. Channel estimation techniques can improve wireless communication performance in the presence of these environmental condition. For example, an electronic device can use channel estimation to determine beamforming configurations that increase signal-to-noise ratios. Channel estimation techniques can provide information about the operating environment in an indirect, composite manner, but direct (e.g., explicit) information about the operating environment (e.g., information about objects within the environment) is still unknown. Without explicit information about the environment, it can be challenging to improve beam management and optimize coverage for wireless communication.

The high-frequency and small-wavelength communications can also struggle to balance performance with the need to meet the Federal Communications Commission's maximum permitted exposure limit (e.g., the FCC's MPE limit). Inefficient balancing can prevent some devices from taking full advantage of increased data rates (e.g., those enabled by 5G or 6G wireless communications). Because exposure is affected by the proximity of a user to a device's antenna, some electronic devices may use a dedicated sensor to detect the user, such as a camera or an infrared sensor. However, these sensors may be bulky or expensive. Furthermore, a single electronic device can include multiple antennas that are positioned on different surfaces (e.g., on a top, a bottom, or opposite sides). To account for each of these antennas, multiple cameras or sensors may need to be installed near each of these antennas, which further increases a cost and size of the electronic device.

To address these challenges, techniques for precoding radar receive signals are described herein. In example implementations, a wireless transceiver capable of performing wireless communication is reconfigured for proximity detection. In some cases, a design of the wireless transceiver can make it challenging to determine angular positions of objects for proximity detection. A hardware limitation within the wireless transceiver, for instance, may not readily support parallel propagation of multiple radar receive signals from multiple antennas for digital beamforming.

To overcome this limitation, the wireless transceiver performs orthogonal precoding on the radar receive signals to enable angular information about an object to be preserved prior to combining the radar receive signals together for propagation across the resource-constrained interface. In some implementations, the precoding of the radar receive signals can be performed using existing components, such as phase shifters. By preserving this information across the resource-constrained interface, an angular position of the object can be measured downstream using digital beamforming techniques.

The angular information provided through proximity detection enables a computing device to determine explicit information about a transmission channel. This differs from the more generalized information about a behavior of the transmission channel, which can be obtained using channel estimation techniques. With explicit information about the transmission channel, the computing device can improve beam management operation and optimize coverage for wireless communication.

Additionally or alternatively, the wireless transceiver can adjust a transmission parameter based on the angular position of the object. For example, the wireless transceiver can steer an uplink signal away from the object to decrease the power density at the object. This adjustment enables the wireless transceiver to meet safety guidelines promulgated by the government or the wireless industry, such as the MPE limit as determined by the FCC.

Some implementations may offer a relatively inexpensive approach that can utilize existing transceiver hardware and antennas. For instance, the computing device can selectively perform proximity detection or wireless communication. In such cases, dual-use of components within the wireless transceiver of a computing device may be enabled, which decreases cost and size of the wireless transceiver, as well as the computing device. In other implementations, the computing device may be utilized in stand-alone proximity-detection applications. For example, the computing device can be implemented as an automotive bumper sensor to assist with parking or autonomous driving. As another example, the computing device can be installed on a drone to provide collision avoidance. Based on the proximity detection, and as described herein, transmission parameters can be adjusted for wireless communication to enable the wireless transceiver to meet safety guidelines promulgated by the government or the wireless industry.

FIG. 1 illustrates an example environment 100 for precoding radar receive signals. In the environment 100, a computing device 102 communicates with a base station 104 through a wireless communication link 106 (wireless link 106). In this example, the computing device 102 is depicted as a smartphone. However, the computing device 102 can be implemented as any suitable computing or electronic device, such as a modem, a cellular base station, a broadband router, an access point, a cellular phone, customer premises equipment (CPE), a gaming device, a navigation device, a media device, a laptop computer, a desktop computer, a tablet computer, a wearable computer, a server, a network-attached storage (NAS) device, a smart appliance or other internet of things (IoT) device, a medical device, a vehicle-based communication system, a radar, a radio apparatus, and so forth.

The base station 104 communicates with the computing device 102 via the wireless link 106, which can be implemented as any suitable type of wireless link. Although depicted as a tower of a cellular network, the base station 104 can represent or be implemented as another device, such as a satellite, a server device, a terrestrial television broadcast tower, an access point, a peer-to-peer device, another smartphone, a mesh network node, and so forth. Therefore, the computing device 102 may communicate with the base station 104 or another device via a wireless connection.

The wireless link 106 can include a downlink of data or control information communicated from the base station 104 to the computing device 102, an uplink of other data or control information communicated from the computing device 102 to the base station 104, or both a downlink and an uplink. The wireless link 106 can be implemented using any suitable communication protocol or standard, such as 2nd-generation (2G), 3rd-generation (3G), 4th-generation (4G), 5th-generation (5G), or 6th-generation (6G) cellular; IEEE 802.11 (e.g., Wi-Fi®); IEEE 802.15 (e.g., Bluetooth® or ultra-wide-band (UWB)); IEEE 802.16 (e.g., WiMAX®); and so forth. In some implementations, the wireless link 106 may wirelessly provide power and the base station 104 or the computing device 102 may comprise a power source.

As shown, the computing device 102 includes an application processor 108 and a computer-readable storage medium 110 (CRM 110). The application processor 108 can include any type of processor, such as a multi-core processor, that executes processor-executable code stored by the CRM 110. The CRM 110 can include any suitable type of data storage media, such as volatile memory (e.g., random access memory (RAM)), non-volatile memory (e.g., Flash memory), optical media, magnetic media (e.g., disk), and so forth. In the context of this disclosure, the CRM 110 is implemented to store instructions 112, data 114, and other information of the computing device 102, and thus does not include transitory propagating signals or carrier waves.

The computing device 102 can also include input/output ports 116 (I/O ports 116) and a display 118. The I/O ports 116 enable data exchanges or interaction with other devices, networks, or users. The I/O ports 116 can include serial ports (e.g., universal serial bus (USB) ports), parallel ports, audio ports, infrared (IR) ports, user interface ports such as a sensing portion of a touchscreen, and so forth. The display 118 presents graphics of the computing device 102, such as a user interface associated with an operating system, program, or application. Alternatively or additionally, the display 118 can be implemented as a display port or virtual interface, through which graphical content of the computing device 102 is presented, and/or the display 118 can be omitted.

The computing device 102 includes a wireless transceiver 120, a modem 122, and multiple antennas 124. The wireless transceiver 120 provides connectivity to respective networks and other electronic devices connected therewith. The wireless transceiver 120 can facilitate communication over any suitable type of wireless network, such as a wireless local area network (WLAN), peer-to-peer (P2P) network, mesh network, cellular network, ultra-wideband network, wireless wide-area-network (WWAN), and/or wireless personal-area-network (WPAN). In the context of the example environment 100, the wireless transceiver 120 enables the computing device 102 to communicate with the base station 104 and networks connected therewith. However, the wireless transceiver 120 can also enable the computing device 102 to communicate "directly" with other devices or networks.

The wireless transceiver 120 includes circuitry and logic for transmitting and receiving signals via the antennas 124. Components of the wireless transceiver 120 can include amplifiers, switches, mixers, analog-to-digital converters, digital-to-analog converters, filters, and so forth for conditioning signals (e.g., for generating or processing signals).

The wireless transceiver 120 can also include logic to perform in-phase/quadrature (I/Q) operations, such as synthesis, encoding, modulation, decoding, demodulation, and so forth. In some cases, components of the wireless transceiver 120 are implemented as separate transmitter and receiver entities. Additionally or alternatively, the wireless transceiver 120 can be realized using multiple or different sections to implement respective transmitting and receiving operations (e.g., separate transmit and receive chains). In general, the wireless transceiver 120 processes data and/or signals associated with communicating data of the computing device 102 over the antennas 124 and/or processes signals associated with proximity detection 128 (or radar sensing). The wireless transceiver 120 can be implemented as a superheterodyne transceiver with multiple upconversion and downconversion stages. Alternatively, the wireless transceiver 120 can be implemented as a direct conversion transceiver, which includes a single upconversion and downconversion stage.

In an example implementation, the wireless transceiver 120 supports proximity detection 128 and wireless communication 130. In other words, the wireless transceiver 120 can be configured to perform proximity detection 128 during a first time interval and perform wireless communication 130 during a second time interval. In other example implementations, the wireless transceiver 120 supports proximity detection 128 and does not support wireless communication 130. In this case, the wireless transceiver 120 can be a transceiver of a dedicated radar system, which is integrated within the computing device 102 or a stand-alone radar system. In still other example implementations, the wireless transceiver 120 supports other applications, which can benefit from aspects of precoding radar receive signals. In other examples, separate transceivers are respectively configured for proximity detection 128 and wireless communication 130.

The modem 122, which can be implemented as a processor, controls the wireless transceiver 120 and enables proximity detection 128 and/or wireless communication 130 to be performed. The modem 122 can include a portion of the CRM 110 or can access the CRM 110 to obtain computer-readable instructions. The modem 122 can include baseband circuitry to perform high-rate sampling processes that can include analog-to-digital conversion, digital-to-analog conversion, Fourier transforms, gain correction, skew correction, frequency translation, and so forth. The modem 122 can provide communication data to the wireless transceiver 120 for transmission. The modem 122 can also process a baseband version of a signal obtained from the wireless transceiver 120 to generate data, which can be provided to other parts of the computing device 102 via a communication interface.

The computing device 102 can also include a controller (not separately shown) to implement one or more aspects of decoding radar receive signals. The controller can include at least one processor and CRM, which stores computer-executable instructions (such as the application processor 108, the CRM 110, and the instructions 112). The processor and the CRM can be localized at one module or one integrated circuit chip or can be distributed across multiple modules or chips. Together, a processor and associated instructions can be realized in separate circuitry, fixed logic circuitry, hard-coded logic, and so forth. The controller can be implemented as part of the wireless transceiver 120, the modem 122, the application processor 108, a special-purpose processor configured to perform MPE techniques, a general-purpose processor, some combination thereof, and so forth.

The interface circuitry 126 (or a communication path(s) thereof) couples at least a portion of the wireless transceiver 120 to the modem 122. In some examples, a communication path of the interface circuitry 126 couples a first portion of the wireless transceiver 120 to a second portion of the wireless transceiver 120, which is coupled to the modem 122. In some implementations, at least a portion of the interface circuitry 126 includes a resource-constrained interface. The resource-constrained interface can include fewer communication paths (e.g., electrical connectors) for reception than there are receiving antennas 124. Although using a limited quantity of communication paths, including one, for reception can reduce interference and noise within the wireless transceiver 120 and decrease implementation area, it does not readily support parallel propagation of multiple receive signals associated with multiple receive chains. In this manner, the resource-constrained interface can make it challenging for the wireless transceiver 120 to propagate information from multiple receive chains to the modem 122 in an independent and parallel (or in an independent and concurrent) manner.

Figure 7:
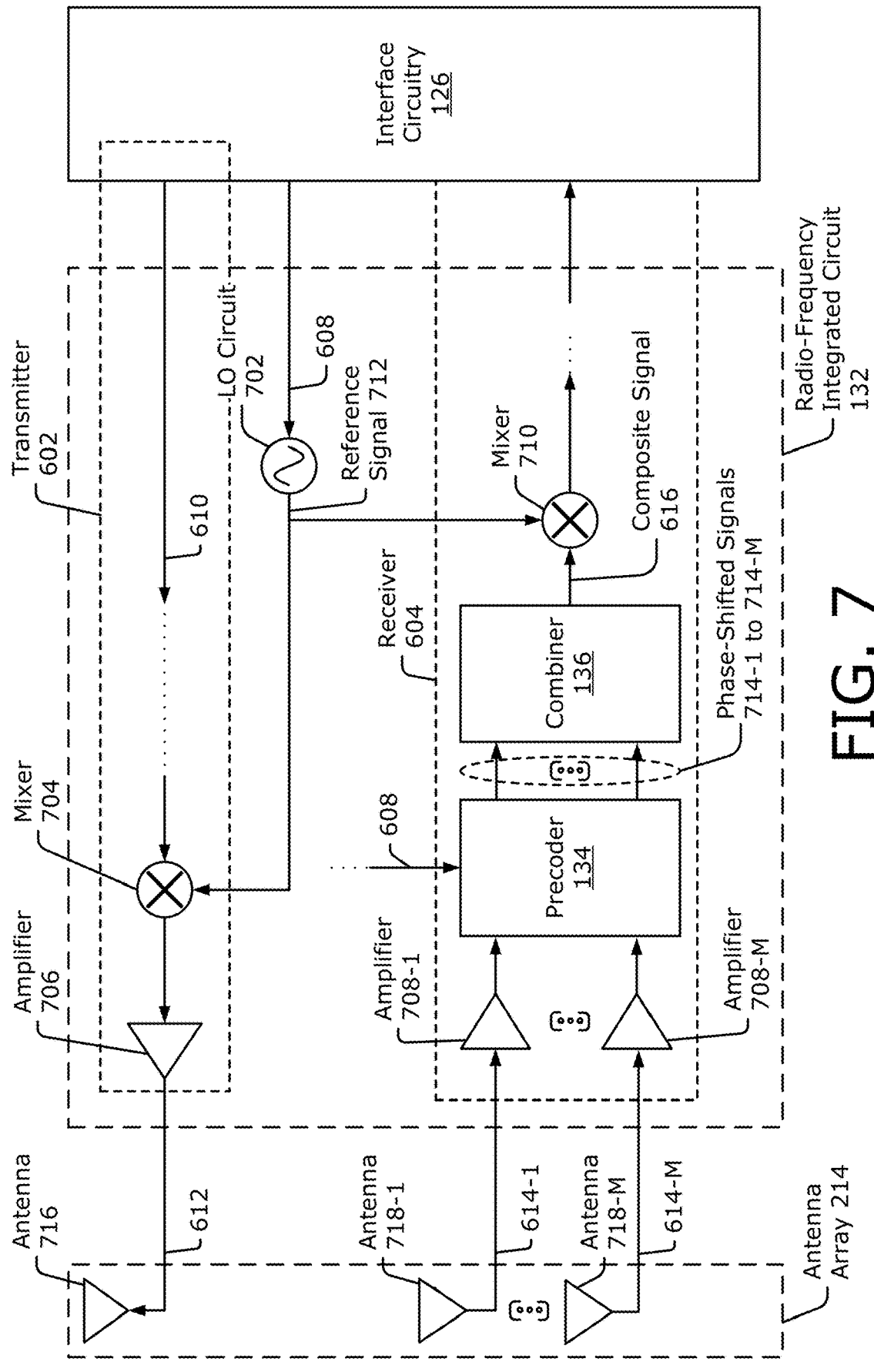
FIG. 7 illustrates example components of an antenna array and a radio-frequency integrated circuit for precoding radar receive signals.

To address the challenges arising from a limited quantity of communication paths, techniques described herein for precoding radar receive signals enable angular information from multiple receive chains to propagate across the resource-constrained interface. In example implementations, the wireless transceiver 120 includes at least one radio-frequency integrated circuit (IC) 132. The radio-frequency integrated circuit 132 can upconvert baseband signals or intermediate-frequency signals to a radio frequency and can downconvert radio-frequency signals to baseband or intermediate frequencies. The radio frequency can include frequencies in the extremely-high frequency spectrum, such as frequencies between approximately 24 and 39 gigahertz (GHz), or more (for example, 57-66 GHz, 71-86 GHZ, or frequencies therebetween or higher frequencies). The radio-frequency integrated circuit 132 includes multiple receive chains (as shown in FIG. 7), at least one precoder 134, and at least one combiner 136.

The precoder 134 can also be referred to as an analog precoder. In example implementations, the precoder 134 is implemented using multiple phase shifters (e.g., using a phase shifter network (PSN)). The phase shifters can selectively be configured to implement the precoder 134 for proximity detection 128 or implement a portion of an analog beamformer for wireless communication 130. In general, the precoder 134 performs orthogonal precoding for purposes of propagating multiple radar receive signals across the interface circuitry 126. In particular, the precoder 134 generates precoded radar receive signals that are orthogonal to each other by encoding each radar receive signal across multiple cycles (or multiple repetition intervals). In other words, the precoder 134 can apply different phase shifts at each cycle of the radar receive signals.

The precoded radar receive signals are orthogonal to each other such that information is preserved when combined together. In mathematical terms, the precoded radar receive signals are orthogonal to each other because their dot product is substantially zero.

The combiner 136 generates a composite radar receive signal by combining the precoded radar receive signals together. The combiner 136 can be implemented as a Wilkinson combiner, a transformer, a directional coupler, and so forth. Due to the orthogonal precoding, the information within the radar receive signals is preserved within the composite radar receive signal and can be extracted downstream to determine an angular position of an object as part of proximity detection 128.

The modem 122 can implement a decoder 138 (or a digital decoder) and a digital beamformer 140. The decoder 138 decodes the composite radar receive signal to extract (or recover) versions of the radar receive signals prior to precoding. In other words, the decoder 138 performs a reciprocal operation relative to the precoder 134. The decoder 138 can also include a splitter to separate the extracted versions of the radar receive signals.

The digital beamformer 140 processes the extracted signals to generate a spatial response. In particular, the digital beamformer 140 analyzes phase rotations across the multiple radar receive signals in a digital domain to determine an angle of arrival associated with the object. Generally speaking, the digital beamformer 140 is implemented by the modem 122 due to the limited space available within other circuits of the wireless transceiver 120. However, other implementations can integrate the digital beamformer 140 within another circuit of the wireless transceiver 120. Consider an example in which the radio-frequency integrated circuit 132 includes a digital signal processor with sufficient processing power to implement the digital beamformer 140. In this case, the digital beamformer 140 is integrated within the radio-frequency integrated circuit 132 instead of the modem 122.

The modem 122 analyzes the spatial response to determine an angle to an object that reflected a radar transmit signal. Based on the determined angle, the modem 122 can adjust one or more beamforming configurations to improve beam management operation and/or optimize coverage for wireless communication 130. Additionally or alternatively, the modem 122 can adjust one or more transmission parameters of the wireless transceiver 120 that are used to transmit a subsequent uplink signal based on the determined angle. In particular, the modem 122 can adjust the transmission parameter to control a power density of the uplink signal at the object and meet MPE guidelines.

Because the MPE limit is affected by the proximity of a user to a device's antenna, techniques described in this document enable greater wireless performance while staying within the FCC's MPE limit. To do so, these techniques generally detect a user's proximity to a device. Based on the detected proximity, the device can balance a power density of transmitted wireless signals with the requirement to meet the MPE limit. As a result, the device is permitted to transmit wireless signals with higher average power levels, which enables the wireless signals to travel farther, such as between a smart phone and a remote cellular base station. Devices and techniques described herein may additionally or alternatively be used to comply with radio frequency exposure requirements promulgated by an organization or jurisdiction outside of the United States. Operations associated with proximity detection 128 and wireless communication 130 are further described with respect to FIG. 2.

FIG. 2 illustrates an example operating environment 200 for proximity detection 128 and wireless communication 130. In the example environment 200, a user holds the computing device 102. In one aspect, the computing device 102 communicates with the base station 104 by transmitting an uplink signal 202 (UL signal 202) or receiving a downlink signal 204 (DL signal 204) via one or more antennas 124. A user's thumb, however, can represent a proximate object 206 that may be exposed to radiation via the uplink signal 202. Other situations are also possible in which the user (or a portion of the user) represents the proximate object 206, including those in which the user is near the computing device 102 but not physically touching the computing device 102. In an example situation, the computing device 102 is positioned within arm's reach of the user on a desk. As another example situation, the computing device 102 is propped up on a table and the user is watching a video on the computing device 102 from a distance.

To detect whether the object 206 exists or is within a detectable range, the computing device 102 transmits a radar transmit signal 208 via at least one of the antennas 124 and receives a radar receive signal 210 via at least two of the antennas 124. In general, the term "range" refers to a slant range or a distance. The transmission of the radar transmit signal 208 and the reception of the radar receive signal 210 can occur during a portion of a time slot, which is further described with respect to FIG. 3. In some cases, the radar receive signal 210 can be received during a portion of time that the radar transmit signal 208 is transmitted.

In a first example, the radar receive signal 210 includes a reflected radar signal 212, which represents a version of the radar transmit signal 208 that is reflected by the object 206. In some situations, the object 206 can be within a detection range associated with proximity detection 128. For instance, a distance between the object 206 and the antennas 124 can be between approximately 3 and 45 centimeters (cm). The detection range may correspond with a near field and/or a far field.

In a second example, the radar receive signal 210 includes a reflected radar signal 216, which represents a version of the radar transmit signal 208 that is reflected by another object 218. The object 218 can represent an obstruction or reflector that is present within the external environment and may impact performance associated with wireless communication 130. In some situations, the object 218 is within a far-field associated with proximity detection 128. For instance, a distance between the object 218 and the antennas 124 can be between approximately 45 cm and 1.5 meters.

The radar transmit signal 208 can be implemented as a frequency-modulated continuous-wave (FMCW) signal or a frequency-modulated pulsed signal. The type of frequency modulation can include a linear frequency modulation, a triangular frequency modulation, a sawtooth frequency modulation, and so forth. In general, the radar transmit signal 208 has multiple cycles (or multiple repetition intervals), as further described with respect to FIGS. 4 and 5. With the radar receive signal 210, an angle and optionally a range to the object 206 and/or 218 can be determined. The same antennas 124 or a subset of the same antennas 124 used to communicate with the base station 104 can be used for proximity detection 128. In other examples, one or more of the antennas 124 used for proximity detection 128 are not used for wireless communication 130.

The antennas 124 may be arranged via modules and/or arrays and may have a variety of configurations. For example, the antennas 124 may comprise at least two different antennas, at least two antenna elements of an antenna array 214 (as shown towards the top of FIG. 2), at least two antenna elements associated with different antenna arrays, or any combination thereof. The antenna array 214 is shown to include multiple antennas 124-1 to 124-N, where N represents a positive integer greater than one. Further, the array 214 may be a multi-dimensional array. Consider, for example, the antennas 124 as comprising at least three antennas 124 of the antenna array 214. One antenna (e.g., antenna 124-1) transmits the radar transmit signal 208, and two other antennas (e.g., antennas 124-2 and 124-N) receive the radar receive signal 210.

The antenna array 214 may be configured for beam management techniques, such as beam determination, beam measurement, beam reporting, or beam sweeping. A distance between the antennas 124 within the antenna array 214 can be based on frequencies that the wireless transceiver 120 emits. For example, the antennas 124 can be spaced apart by approximately half a wavelength from one another (e.g., by approximately half a centimeter (cm) apart for frequencies around 30 GHz). The antennas 124 may be implemented using any type of antenna, including patch antennas, dipole antennas, bowtie antennas, or a combination thereof.

In general, quantities of antennas 124 that are used for transmission or reception can vary based on an operational mode of the wireless transceiver 120 or vary over time for a same operational mode. For proximity detection 128, at least one of the antennas 124 can be used for transmission and at least two other antennas 124 can be used for reception to enable the computing device 102 to determine an angle to the object 206 or 218. In contrast, for wireless communication 130 that uses time-division duplexing, all of the antennas 124 can be used to transmit the uplink signal 202 during a first time and all of the antennas 124 can be used to receive the downlink signal 204 during a second time. In other words, the wireless transceiver 120 dynamically uses any quantity of the antennas 124 for transmission and reception.

The presence of the objects 206 and/or 218 can make wireless communication 130 challenging in several ways. In one example, the objects 206 and/or 218 cause a wireless communication signal to reflect, diffract, or scatter, which results in multiple propagation paths. The multiple propagation paths can cause multiple delayed versions of the wireless communication signal to reach a receiving entity at different times. This can cause the received wireless communication signal to become distorted (e.g., due to intersymbol interference (ISI)) or have a smaller signal-to-noise ratio.

In another example, the objects 206 and/or 218 can prevent the base station 104 and the computing device 102 from having direct line-of-sight communication. By using proximity detection 128 to determine explicit information (e.g., position and/or velocity) about the objects 206 and/or 218, the computing device 102 can customize beamforming configurations to increase a signal-to-noise ratio at a receiving entity and/or reduce interference. In this manner, proximity detection 128 provides spatial awareness and enables the computing device 102 to overcome propagation obstructions and improve beam management. An example sequence for switching between proximity detection 128 and wireless communication 130 is further described with respect to FIG. 3.

Figure 3:
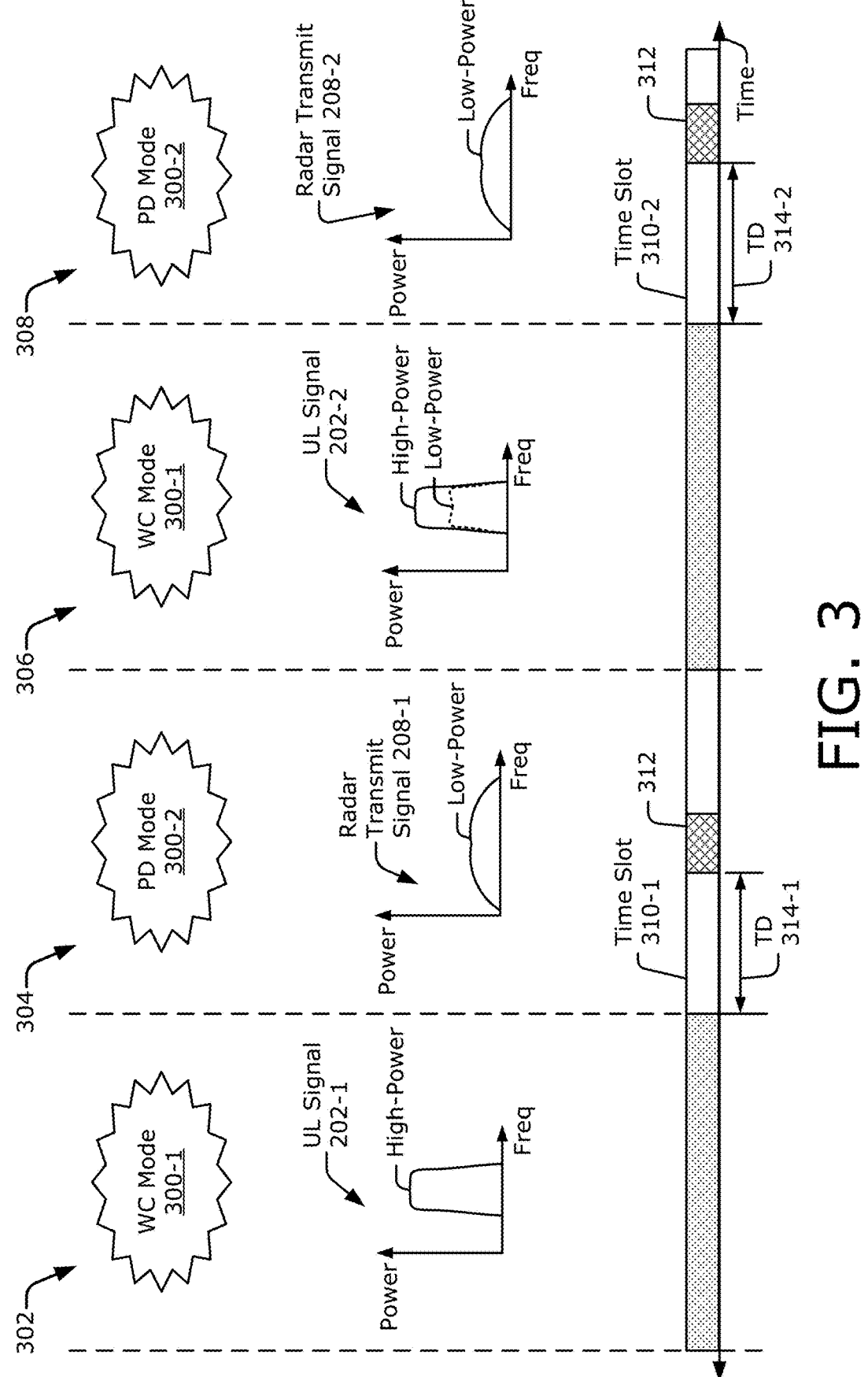
FIG. 3 illustrates an example sequence flow diagram for proximity detection and wireless communication.

FIG. 3 illustrates an example sequence flow diagram for proximity detection 128 and wireless communication 130, with time elapsing from left to right. Examples of a wireless communication mode 300-1 (WC mode 300-1) are shown at 302 and 306, and examples of a proximity detection mode 300-2 (PD mode 300-2) are shown at 304 and 308. The proximity detection mode 300-2 can occur during a time slot 310, such as time slot 310-1 at 304 and time slot 310-2 at 308. The time slot 310 can include a time interval in which proximity detection 128 is performed by the computing device 102. An example time slot 310 includes an uplink random-access-channel (RACH) time slot (UL RACH time slot). The time slot 310 can occur at fixed time intervals, between active data cycles that occur during wireless communication 130, at predetermined times as set by the modem 122, as part of an initialization process before wireless communications 130 occur, and so forth. Additionally or alternatively, some implementations of the computing device 102 can perform proximity detection 128 responsive to detection of device movement, or based on indications that the user may be proximate to the computing device 102 (e.g., based on the wireless transceiver 120 observing a decrease in power in a downlink signal 204 or the application processor 108 determining that the user is interacting with the display 118 of the computing device 102).

At 302, the wireless transceiver 120 transmits a high-power (e.g., normal) uplink signal 202-1 configured to provide sufficient range to a destination, such as a base station 104. After transmitting the uplink signal 202-1, the computing device 102 transmits a radar transmit signal 208-1 during a first time slot 310-1 at 304. A duration of a transmission of the radar transmit signal 208-1 within the first time slot 310-1 is represented by a diamond pattern at 312. A start time of the radar transmit signal 208-1 can be based on a time delay 314-1 (TD 314-1), which is relative to a start time of the first time slot 310-1.

As described above, a radar transmit signal 208 enables the computing device 102 to detect the object 206 or 218 and determine if the object 206 or 218 is near the computing device 102. At 304, the radar transmit signal 208-1 is represented by a low-power wide-band signal. In example implementations, the radar transmit signal 208-1 can have a bandwidth of approximately 2 GHz or more (e.g., 2 GHZ, 3 GHZ, 4 GHz, and so forth). Based on a detection, the wireless transceiver 120 can adjust a transmission parameter for a next uplink signal 202 to account for MPE compliance guidelines.

In some examples, the proximity detection mode 300-2 can determine the range to the object 206 or 218 thereby enabling transmission of the uplink signal 202 to comply with safety guidelines, such as a maximum power density. Because power density is proportional to transmit power and inversely proportional to range, an object at a closer range is exposed to a higher power density than another object at a farther range for a same transmit power level. Therefore, a similar power density at the objects 206 or 218 can be achieved by increasing the transmit power level if the object 206 or 218 is at a farther range and decreasing the transmit power level if the object 206 or 218 is at a closer range. In this way, the wireless transceiver 120 can adjust transmission of the uplink signal 202 to enable the power density at the object 206 or 218 for both the closer range and the farther range to be below the maximum power density. At the same time, because the range is known, the transmit power level can be increased to a level that facilitates wireless communication 130 and comports with the compliance guideline.

At 306, the wireless transceiver 120 transmits a next uplink signal 202-2. In the depicted example, the uplink signal 202-2 can be a high-power uplink signal if an object 206 or 218 is not detected at 304. Alternatively, the uplink signal 202-2 can be a low-power uplink signal if an object 206 and/or 218 is detected at 304. The low transmit power can be, for example, between approximately five and twenty decibel-milliwatts (dBm) less than the high-power signal at 302.

In addition to or instead of changing a power, the uplink signal 202-2 can be transmitted using a different antenna within the computing device 102 or using a different beam steering angle (e.g., different than the antennas 124 or the beam steering angle used for transmitting the uplink signal 202-1 at 302). In some implementations, the computing device 102 uses a different beamforming configuration to improve signal-to-noise ratio based on the angle to the object 206 or 218. Although not shown, the wireless transceiver 120 can alternatively skip the wireless communication mode 300-1 at 306 and perform proximity detection 128 using another antenna or a different transmit power level to detect objects 206 and/or 218 at various locations, distances, or angles around the computing device 102. While certain operations were described above based on a range to the object 206 or 218, it will be appreciated that operations in the wireless communication mode 300-1 at 306 or adjustments made pursuant to the proximity detection mode 300-2 may be based merely upon whether the object 206 or 218 is present or not, irrespective of the range thereto.

At 308, the wireless transceiver 120 and antenna 124 transmit another radar transmit signal 208-2 during a second time slot 310-2 to attempt to detect the object 206 or 218 (or another object). A second time delay 314-2 (TD 314-2) associated with the radar transmit signal 208-2 can be similar to or different than the first time delay 314-1.

By scheduling multiple radar transmit signals 208 over some time period, transmission of the uplink signal 202 can be dynamically adjusted based on a changing environment or movement by the objects 206 and/or 218. Furthermore, appropriate adjustments can be made to balance wireless communication performance with beam management and compliance with radiation requirements. The sequence described above can also be applied to other antennas. The other antennas and the antennas 124 may transmit multiple radar transmit signals 208 sequentially or in parallel. Aspects of the radar transmit signal 208 are further described with respect to FIGS. 4 and 5.

Figure 4:
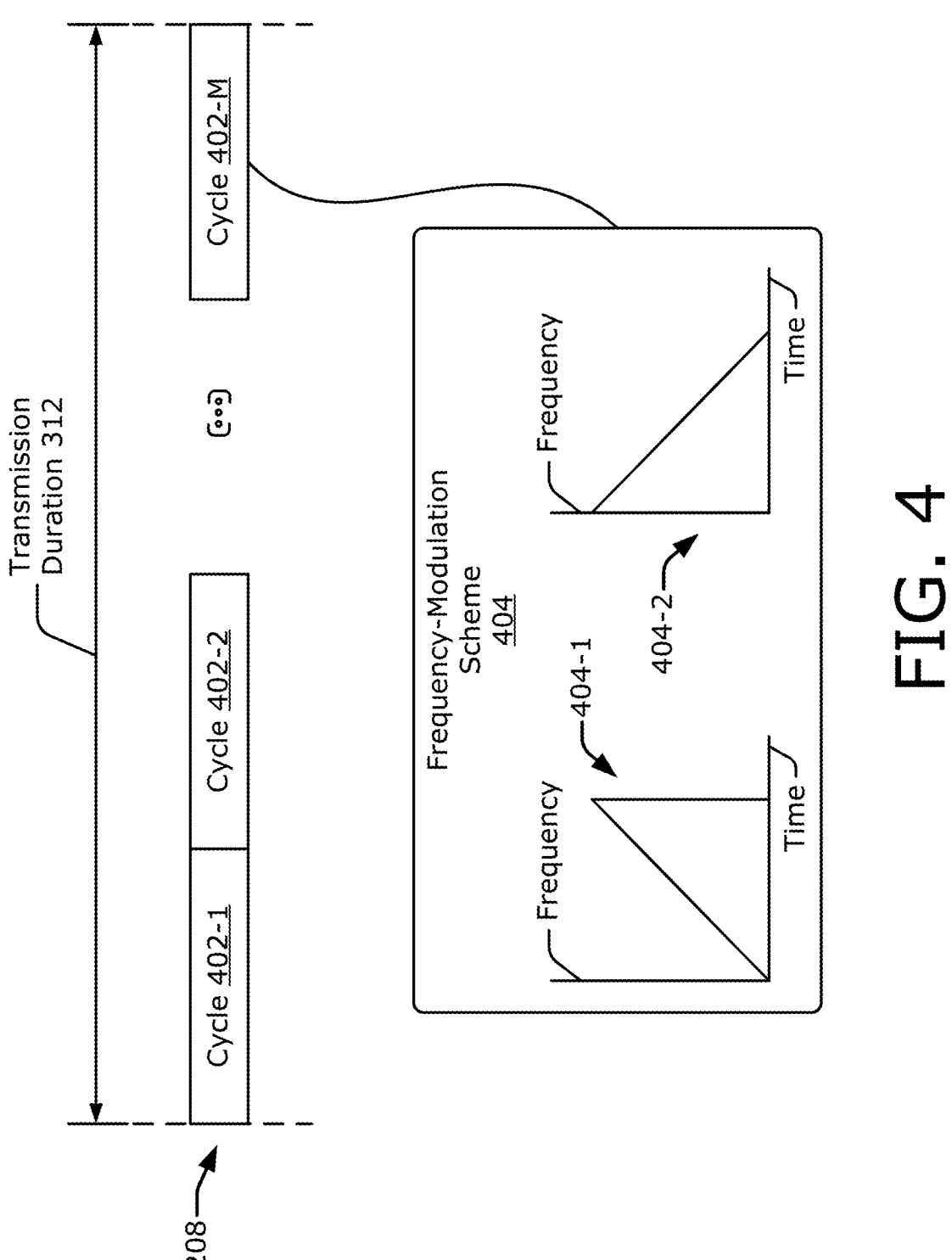
FIG. 4 illustrates example cycles of a radar transmit signal for implementing aspects of precoding radar receive signals.

FIG. 4 illustrates example cycles 402 of a radar transmit signal 208 for implementing aspects of precoding radar receive signals. As shown in FIG. 4, the radar transmit signal 208 has a particular transmission duration 312 within the time slot 310 and includes multiple cycles 402-1, 402-2 . . . . 402-M, where M represents a positive integer. In general, the variable M is equal to a quantity of antennas 124 that receive the radar receive signal 210. In example implementations, durations of the cycles 402-1 to 402-M are determined based on the quantity of cycles (e.g., M) and the transmission duration 312. In some implementations, the durations of the cycles 402-1 to 402-M are approximately equal to each other. In other implementations, the durations of the cycles 402-1 to 402-M can vary.

In example implementations, the radar transmit signal 208 is modulated in frequency across the multiple cycles 402 based on one or more frequency-modulation schemes 404. As the radar receive signals 210 represent reflected versions of the radar transmit signal 208, the radar receive signals 210 are also modulated in frequency across the multiple cycles based on the one or more frequency-modulation schemes of the radar transmit signal 208.

The cycle 402 can be referred to as a repetition interval (e.g., a pulse repetition interval) or a modulation period. With multiple cycles 402-1 to 402-M, the radar transmit signal 208 has some form of repetition or redundancy that enables precoding to be performed on the radar receive signals 210. This repetition or redundancy causes the radar transmit signal 208 to have multiple iterations associated with one or more frequency-modulation schemes 404.

In general, each cycle 402 is associated with a particular frequency-modulation scheme 404. The cycles 402-1 to 402-M can have similar or different frequency-modulation schemes 404. One example frequency-modulation scheme 404 (e.g., frequency-modulation scheme 404-1) increases frequency over time. Another example frequency-modulation scheme 404 (e.g., frequency-modulation scheme 404-2) decreases frequency over time. In this example, the frequency-modulation scheme 404-2 represents a "flipped" version of the frequency-modulation scheme 404-1. Still another example frequency-modulation scheme 404 can include a combination of schemes 404-1 and 404-2, which can be repeated each cycle 402.

Example frequency-modulation schemes 404 can be linear (as shown in FIG. 4) or non-linear. The cycles 402-1 to 402-M can be implemented using a variety of different frequency-modulation schemes 404, which can have different bandwidths, different durations, and/or different slopes. Example radar transmit signals 208 with different quantities of cycles 402 and utilizing different combinations of frequency-modulation schemes 404 are further described with respect to FIG. 5.

Figure 5:
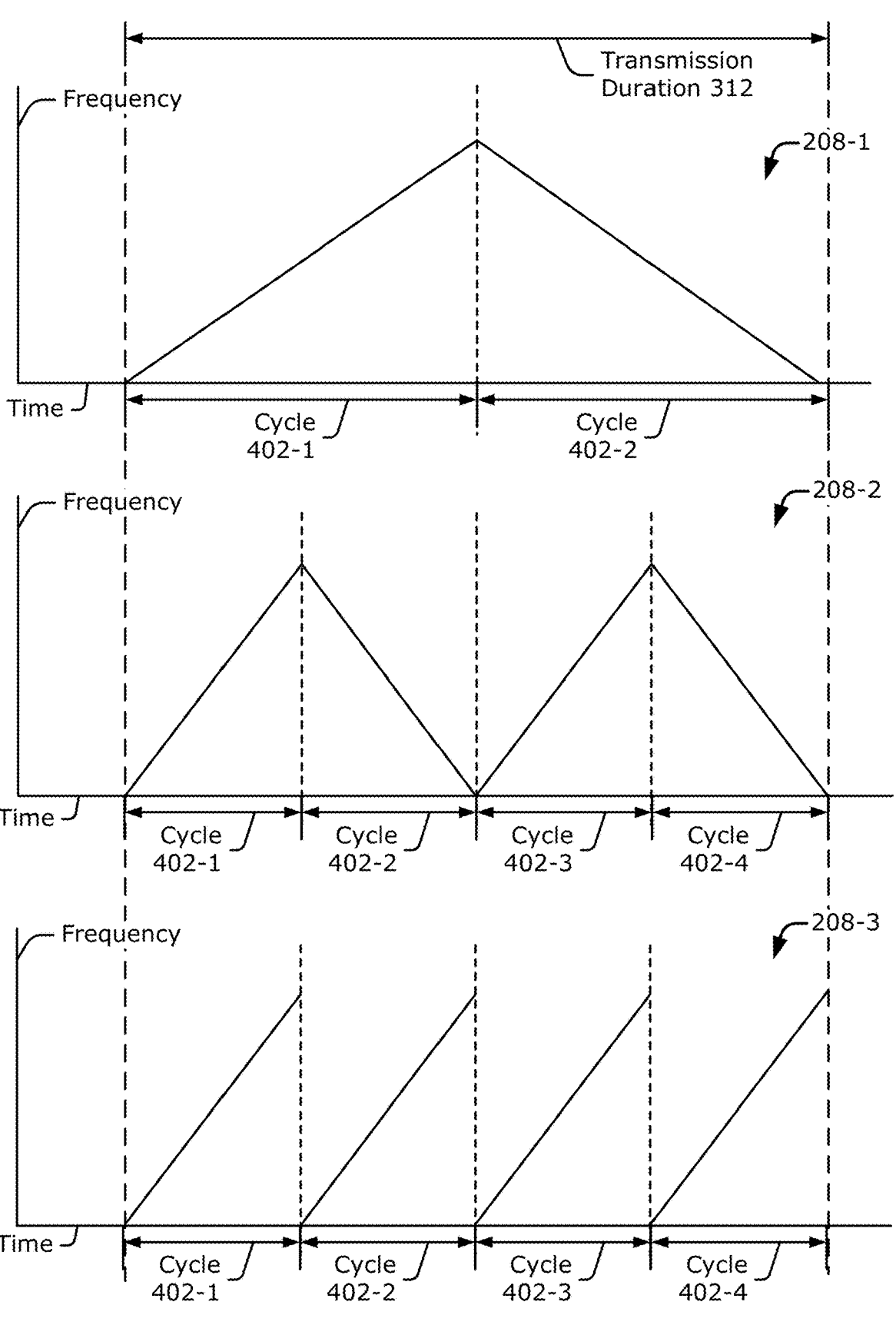
FIG. 5 illustrates example radar transmit signals for implementing aspects of precoding radar receive signals.

FIG. 5 illustrates example radar transmit signals 208-1, 208-2, and 208-3 for implementing aspects of precoding radar receive signal. Consider the radar transmit signal 208-1, which has two cycles 402-1 and 402-2. In this case, the duration of each of the cycles 402-1 and 402-2 is approximately equal to half the transmission duration 312. The first cycle 402-1 has a different frequency-modulation scheme 404 compared to the second cycle 402-2. In particular, the first cycle 402-1 is associated with the first frequency-modulation scheme 404-1, and the second cycle 402-2 is associated with the second frequency-modulation scheme 404-2. This means that the wireless transceiver 120 modulates the first cycle 402-1 of the radar transmit signal 208-1 in accordance with the first frequency-modulation scheme 404-1 and modulates the second cycle 402-2 of the radar transmit signal 208-1 in accordance with the second frequency-modulation scheme 404-2. The two cycles 402-1 and 402-2 of the radar transmit signal 208-1 enable the wireless transceiver 120 to perform precoding on two radar receive signals 210.

The radar transmit signal 208-2 has four cycles 402-1, 402-2, 402-3, and 402-4. The duration of each of the cycles 402-1 to 402-4 is approximately equal to a quarter of the transmission duration 312. Some of the cycles 402 have similar frequency-modulation schemes 404, and some of the cycles 402 have different frequency-modulation schemes 404. For example, the cycles 402-1 and 402-3 are associated with the frequency-modulation scheme 404-1, where the frequency increases over time, and the cycles 402-2 and 402-4 are associated with the frequency-modulation scheme 404-2, where the frequency decreases over time. This means that the wireless transceiver 120 modulates the cycles 402-1 and 402-3 of the radar transmit signal 208-2 in accordance with the first frequency-modulation scheme 404-1 and modulates the cycles 402-2 and 402-4 of the radar transmit signal 208-2 in accordance with the second frequency-modulation scheme 404-2. The four cycles 402-1 to 402-4 of the radar transmit signal 208-2 enable the wireless transceiver 120 to perform precoding on two, three, or four radar receive signals 210.

The radar transmit signal 208-3 has four cycles 402-1 to 402-4 similar to the radar transmit signal 208-2. In this example, however, all of the cycles 402-1 to 402-4 have a same frequency-modulation scheme 404. This means that the wireless transceiver 120 modulates the cycles 402-1 to 402-4 of the radar transmit signal 208-3 in accordance with the first frequency-modulation scheme 404-1. The four cycles 402-1 to 402-4 of the radar transmit signal 208-3 enable the wireless transceiver 120 to perform precoding on two, three, or four radar receive signals 210.

Sometimes the radar transmit signal 208 is modulated in frequency in a manner that is symmetrical across a midpoint of the transmission duration 312. For instance, the radar transmit signals 208-1 and 208-2 are approximately symmetrical about the midpoint of the transmission duration 312. In some cases, it can be advantageous to transmit radar transmit signals 208 having at least one cycle 402 modulated based on the frequency-modulation scheme 404-1 and at least one other cycle 402 modulated based on the frequency-modulation scheme 404-2. This multi-slope scheme enables Doppler frequency to be readily measured and can also reduce phase discontinuity at a transition point between two cycles 402. The multiple cycles 402 within the radar transmit signals 208-1 to 208-3 enable the wireless transceiver 120 to perform orthogonal precoding, as further described with respect to FIG. 6.

Figure 6:
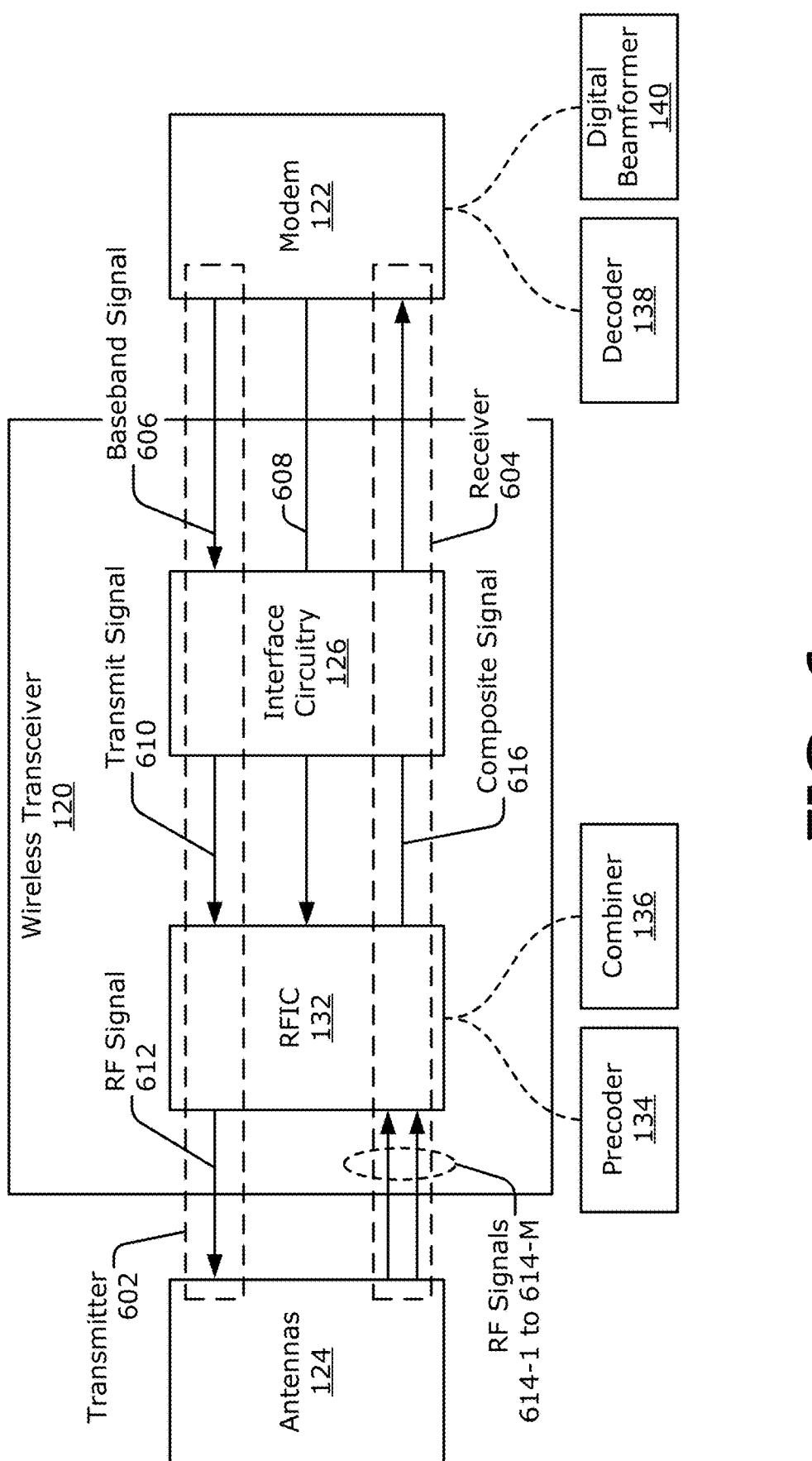
FIG. 6 illustrates example components of a wireless transceiver for precoding radar receive signals.

FIG. 6 illustrates example components of the wireless transceiver 120. In the depicted configuration, the wireless transceiver 120 is coupled between the antennas 124 and the modem 122. The wireless transceiver 120 includes a transmitter 602, a receiver 604, the radio-frequency integrated circuit 132, and the interface circuitry 126. The transmitter 602 and the receiver 604 are distributed through portions of the radio-frequency integrated circuit 132 and portions of the interface circuitry 126.

Generally for transmission, the modem 122 generates a baseband signal 606, which is provided to the interface circuitry 126. The modem 122 also generates a control signal 608, which can configure aspects of the interface circuitry 126 and/or the radio-frequency integrated circuit 132 for proximity detection 128 and/or wireless communication 130. In some implementations, the modem 122 uses frequency-division multiplexing to enable both the baseband signal 606 and the control signal 608 to propagate through a single communication path within the interface circuitry 126. In other implementations, the baseband signal 606 and the control signal 608 propagate through the interface circuitry 126 via separate communication paths.

The control signal 608 includes at least one transmission parameter and/or at least one reception parameter that configures at least one component within the transmitter 602 or the receiver 604, respectively. As an example, the control signal 608 specifies a gain of an amplifier (e.g., a power amplifier, a low-noise amplifier, or a variable-gain amplifier), phase-shift information for an analog phase shifter, an operational state of a switch that connects an antenna 124 to the transmitter 602 or the receiver 604, and so forth.

The interface circuitry 126 generates a transmit signal 610 based on the baseband signal 606 and passes the transmit signal 610 to the radio-frequency integrated circuit 132. The transmit signal 610 can represent the baseband signal 606 or a modified version of the baseband signal 606. In some implementations, the interface circuitry 126 further conditions the baseband signal 606 to generate the transmit signal 610. For example, the interface circuitry 126 modulates a characteristic of the baseband signal 606, filters the baseband signal 606, and/or upconverts the baseband signal 606 from a baseband frequency to an intermediate frequency. The intermediate frequency can be on the order of several gigahertz, such as between approximately 5 and 15 GHz. Depending on the operational mode of the wireless transceiver 120, the transmit signal 610 can be used to generate the radar transmit signal 208 or the uplink signal 202.

The radio-frequency integrated circuit 132 generates a radio-frequency (RF) signal(s) 612 (RF signal 612) based on the transmit signal 610. For example, the radio-frequency integrated circuit 132 can upconvert the transmit signal 610 to a radio frequency from a baseband or an intermediate frequency to generate the radio-frequency signal 612. The radio frequency can include frequencies in the extremely-high frequency (EHF) spectrum, such as frequencies between approximately 25 and 86 GHz. The radio-frequency integrated circuit 132 can also amplify, filter, and/or shift a phase of the transmit signal 610 to generate the radio-frequency signal(s) 612. The radio-frequency integrated circuit 132 provides the radio-frequency signal(s) 612 to one or more of (e.g., respective) the antennas 124 for transmission. As shown via the transmitter 602, the radio-frequency signal 612 is derived from the transmit signal 610, which in turn is derived from the baseband signal 606.

For proximity detection 128, the baseband signal 606 can represent a signal with a constant tone (or a constant frequency). Also, the radio-frequency signal 612 can represent the radar transmit signal 208. For wireless communication 130, the baseband signal 606 can include data provided to the modem 122 by the computing device 102. Also, the radio-frequency signal 612 can represent the uplink signal 202. The control signal 608 can include information such as a beamforming configuration and/or a transmission parameter for transmitting the uplink signal 202.

Other implementations are also possible in which the baseband signal 606, the transmit signal 610, or the radio-frequency signal 612 for proximity detection 128 is generated by another component of the wireless transceiver 120 based on a command sent by the modem 122. In this case, the modem 122 may not directly generate the baseband signal 606 for proximity detection 128. Instead, a local oscillator or signal generator within the wireless transceiver 120 generates one of these signals for proximity detection 128. In some implementations, a local oscillator circuit (e.g., local oscillator circuit 702 of FIG. 7) of the radio-frequency integrated circuit 132 directly generates the signal for proximity detection 128. As such, the signal for proximity detection 128 can be generated without mixing a reference signal with a constant-tone signal generated by the modem 122. In this case, the signal for proximity detection 128 can be directly injected into a signal propagation path within the transmitter 602.

Generally for reception, the antennas 124 pass multiple radio-frequency (RF) signals 614-1 to 614-M (RF signals 614-1 to 614-M) to the receiver 604. The radio-frequency signals 614-1 to 614-M represent portions of a receive signal that are individually received by M antennas 124. Due to the different physical locations of the antennas 124, the radio-frequency signals 614-1 to 614-M can have different phases relative to each other. For proximity detection 128, these phase differences can be analyzed to determine an angular position of the object 206 or 218.

The radio-frequency integrated circuit 132 uses the precoder 134 and the combiner 136 to generate at least one composite signal 616. The quantity of composite signals 616 generated by the radio-frequency integrated circuit 132 can correspond to a quantity of communication paths within (a portion of) the interface circuitry 126 that are available for reception. The interface circuitry 126 passes the composite signal 616 to the modem 122. The modem 122 processes the composite signal 616 for proximity detection 128 or wireless communication 130. As shown via the receiver 604, the composite signal 616 is derived from the radio-frequency signals 614-1 to 614-M. Depending on an implementation of the interface circuitry 126, the modem 122 can directly receive the composite signal 616 or receive multiple signals that are derived from the composite signal 616, as further described below.

Consider an example in which the interface circuitry 126 has one communication path available for reception in a particular portion or area of the interface circuitry 126. In this case, the combiner 136 can generate a single composite signal 616 that represents a combination of the radio-frequency signals 614-1 to 614-M. In another example, the interface circuitry 126 has two communication paths available for reception in the portion or area. As such, the combiner 136 can generate two composite signals 616 that represent two different groups of radio-frequency signals 614-1 to 614-M (e.g., a first half of the radio-frequency signals 614-1 to 614-M and a second half of the radio-frequency signals 614-1 to 614-M). By combining the radio-frequency signals 614-1 to 614-M together, the composite signal 616 can propagate across the resource-constrained interface of the interface circuitry 126.

For proximity detection 128, the radio-frequency signals 614-1 to 614-M represent multiple instances of the radar receive signal 210, which are received by respective antennas 124. The precoder 134 performs orthogonal precoding on the radar receive signals 210 based on a codebook. The codebook can be provided to the radio-frequency integrated circuit 132 by the control signal 608, as further described with respect to FIG. 9. The combiner 136 combines the precoded radar receive signals to generate the composite signal 616, which can be referred to as a composite radar receive signal.

The modem 122 uses the decoder 138 to recover the information within the radio-frequency signals 614-1 and 614-M by reversing the precoding operation performed by the precoder 134. With the recovered signals, the modem 122 can determine an angular position of the object 206 or 218 using the digital beamformer 140. Based on the angular position of the object 206, the modem 122 can update a beamforming configuration of the computing device 102 or update a transmission parameter to improve wireless communication performance.

For wireless communication 130, the radio-frequency signals 614-1 to 614-M can represent multiple instances of the downlink signal 204. The precoder 134 and the combiner 136 can optionally perform aspects of analog beamforming to improve wireless communication performance. In this case, the composite signal 616 represents an output signal generated by the analog beamformer. The modem 122 processes the composite signal 616 to extract data for wireless communication 130.

In example implementations, the interface circuitry 126 can have a limited quantity of communication paths (e.g., a limited quantity of electrical connectors) between at least two circuits for handling reception operations that involve propagating receive signals between the at least two circuits. The two circuits can include the radio-frequency integrated circuit 132 and the modem 122, the radio-frequency integrated circuit 132 and another integrated circuit (e.g., an intermediate-frequency integrated circuit), or the other integrated circuit and the modem 122. The limited quantity of communication paths can be less than the quantity of radio-frequency signals 614-1 to 614-M to be propagated to perform digital beamforming, for instance. In such cases, there are not enough communication paths to independently propagate the radio-frequency signals 614-1 to 614-M in parallel.

In some cases, the interface circuitry 126 includes a single communication path between at least two circuits within the wireless transceiver 120. Using this single communication path, the interface circuitry 126 can pass a signal for transmission (e.g., the transmit signal 610), a received signal (e.g., the composite signal 616), and control information (e.g., the control signal 608). In some implementations, the control signal 608 propagates through the communication path during a same time that the signal for transmission or the received signal propagates through the communication path. The interface circuitry 126 can include a serial interface and use Manchester encoding and decoding to pass the control signal 608 across the serial interface from the modem 122 to another circuit within the wireless transceiver 120.

In an example implementation not shown, the resource-constrained interface of the interface circuitry 126 exists between the radio-frequency integrated circuit 132 and another integrated circuit disposed in the interface circuitry 126 (e.g., the intermediate-frequency integrated circuit). In this case, the precoder 134 and the combiner 136 are disposed in the radio-frequency integrated circuit 132 and the decoder 138 is disposed in the integrated circuit within the interface circuitry 126. In an additional implementation not shown, the resource-constrained interface exists between the integrated circuit disposed within the interface circuitry 126 and the modem 122. As such, the combiner 136 and optionally the precoder 134 are disposed within the interface circuitry 126, and the decoder 138 is disposed within the modem 122. Depending on where the precoder 134 and the decoder 138 are implemented, these circuits can be implemented using analog components, digital components, or a combination thereof. Components of the transmitter 602 and the receiver 604 are further described with respect to FIG. 7.

FIG. 7 illustrates example components of the antenna array 214 and the radio-frequency integrated circuit 132 for precoding radar receive signals. In the depicted configuration, the antenna array 214 includes at least one transmit antenna 716 and multiple receive antennas 718-1 to 718-M. Together, the transmit antenna 716 and the receive antennas 718-1 to 718-M represent the antennas 124-1 to 124-N shown in FIG. 2. The radio-frequency integrated circuit 132 is coupled between the interface circuitry 126 and the antenna array 214. The radio-frequency integrated circuit 132 includes at least a portion of the transmitter 602 and at least a portion of the receiver 604.

Figure 8:
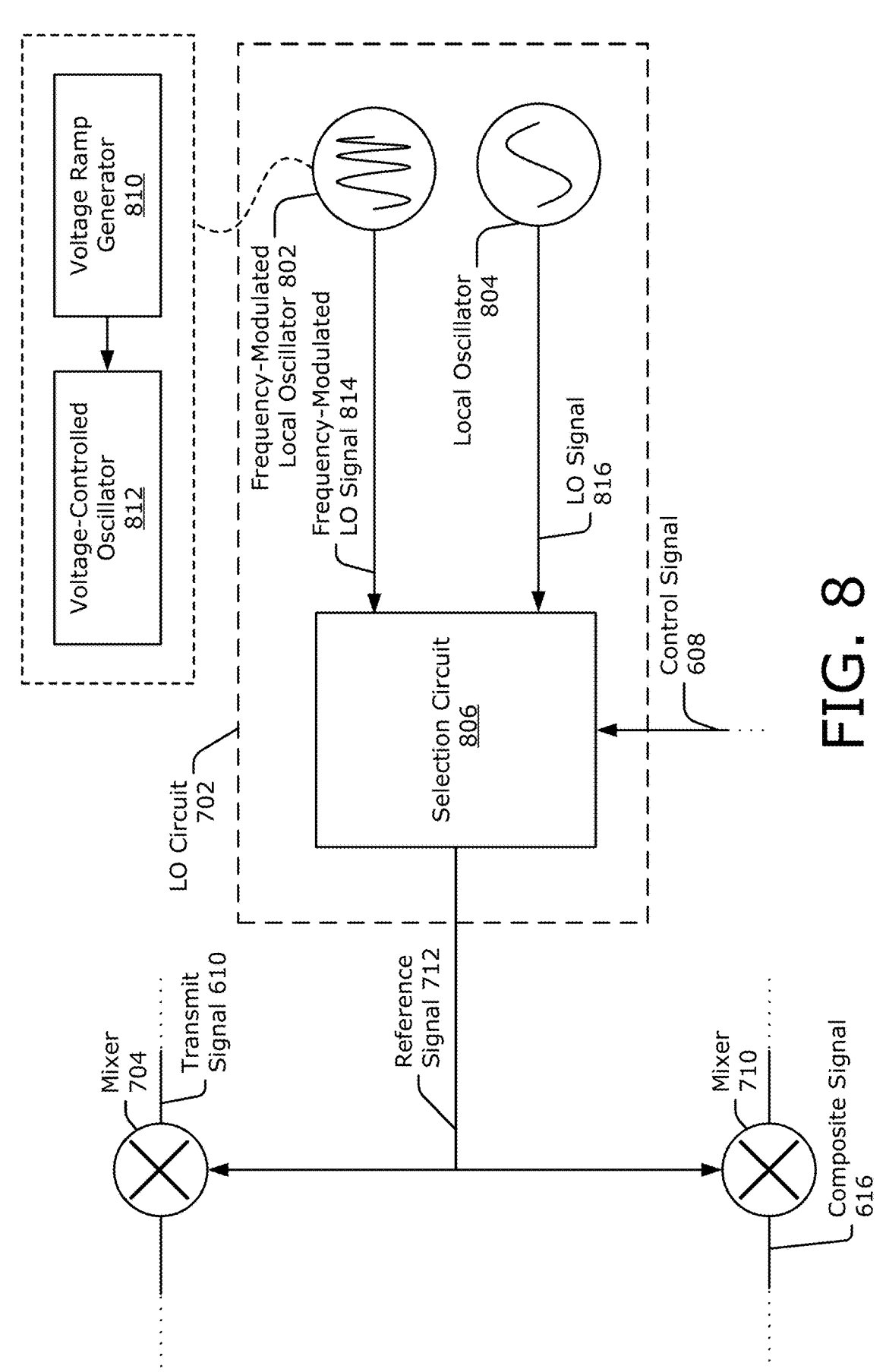
FIG. 8 illustrates an example local oscillator circuit for supporting proximity detection and wireless communication.

The radio-frequency integrated circuit 132 also includes at least one local oscillator circuit 702, which is further described with respect to FIG. 8. Other implementations are also possible in which the local oscillator circuit 702 is implemented within another part of the wireless transceiver 120 (e.g., within an intermediate-frequency integrated circuit). The local oscillator circuit 702 provides a reference signal that enables the radio-frequency integrated circuit 132 (and more generally the wireless transceiver 120) to selectively perform proximity detection 128 or wireless communication 130. A configuration of the local oscillator circuit 702 can be controlled by the modem 122 using the control signal 608, as further described with respect to FIG. 8.

The transmitter 602 includes at least one transmit chain, which is coupled to the transmit antenna 716. In this example, the transmitter 602 is shown to have a single transmit chain, however other implementations of the transmitter 602 can include multiple transmit chains. The transmitter 602 is shown to include at least mixer 704 and at least one amplifier 706 (e.g., a power amplifier).

The receiver 604 includes multiple receive chains, which are coupled to the receive antennas 718-1 to 718-M. In this example, the receiver 604 is shown to have two receive chains, which are respectively coupled to the antennas 718-1 and 718-M. The two receive chains include respective amplifiers 708-1 and 708-M. The receiver 604 also includes the precoder 134, the combiner 136, and a mixer 710. The precoder 134 is coupled to the amplifiers 708-1 and 708-M and the combiner 136. The combiner 136 is coupled between the precoder 134 and the mixer 710. The precoder 134 can include components that are distributed across the multiple receive chains of the receiver 604. The combiner 136 is coupled to the multiple receive chains of the receiver 604 and causes the receive chains to merge into one or more composite receive chains. The transmitter 602 and the receiver 604 can also include other additional components that are not depicted in FIG. 7 such as phase shifters, additional amplifiers, additional mixers, switches, and so forth.

During operation, the local oscillator circuit 702 generates a reference signal 712. The reference signal 712 enables the mixers 704 and 710 to upconvert or downconvert analog signals within the transmitter 602 and the receiver 604, respectively. The reference signal 712 can have a continuous tone or can be modulated in frequency, as further described with respect to FIG. 8. The local oscillator circuit 702 provides an appropriate version of the reference signal 712 to support proximity detection 128 or wireless communication 130.

For transmission, the transmitter 602 generates the radio-frequency signal 612 by using the mixer 704 to upconvert the transmit signal 610 based on the reference signal 712 provided by the local oscillator circuit 702. The transmitter 602 also amplifies the upconverted transmit signal 610 using the amplifier 706. The antenna 716 transmits the amplified radio-frequency signal 612. During proximity detection 128, the radio-frequency signal 612 represents the radar transmit signal 208, which has multiple cycles 402 as described with respect to FIGS. 4 and 5. During wireless communication 130, the radio-frequency signal 612 represents the uplink signal 202.

For reception, the receive antennas 718-1 to 718-M receive the radio-frequency signals 614-1 to 614-M. The receiver 604 amplifies the radio-frequency signals 614-1 to 614-M using the amplifiers 708-1 to 708-M. The precoder 134 shifts phases of the amplified radio-frequency signals 614-1 to 614-M based on the control signal 608 provided by the modem 122. The precoder 134 generates phase-shifted signals 714-1 to 714-M and passes these signals to the combiner 136. Depending on the operational mode of the radio-frequency integrated circuit 132, the precoder 134 can perform aspects of precoding radar receive signals for proximity detection 128 or can perform aspects of analog beamforming for wireless communication 130. An operation of the precoder 134 for proximity detection 128 is further described with respect to FIG. 7.

The combiner 136 generates a composite signal 616 based on the phase-shifted signals 714-1 to 714-M. The mixer 710 downconverts the composite signal 616 based on the reference signal 712 provided by the local oscillator circuit 702. The radio-frequency integrated circuit 132 passes the downconverted composite signal 616 to the interface circuitry 126.

In FIG. 7, the antennas 716 and 718-1 to 718-M can have a same polarization, such as a horizontal polarization or a vertical polarization. Other implementations of the antenna array 214 and the radio-frequency integrated circuit 132 are also possible. For example, the transmitter 602 can have two transmit chains that are coupled to two antennas 124 with different polarizations (e.g., a horizontally-polarized antenna and a vertically-polarized antenna) or two feed ports of a single antenna 124 that are associated with different polarizations. Also, the receiver 604 can include more than two receive chains, such as four receive chains. Two of the four receive chains can be coupled to two horizontally-polarized antennas 124. Another two of the four receive chains can be coupled to two vertically-polarized antennas 124. In this case, the receiver 604 can perform aspects of precoding radar receive signals for signals associated with different polarizations. Components of the local oscillator circuit 702 that enable the radio-frequency integrated circuit 132 to selectively support proximity detection 128 or wireless communication 130 are further described with respect to FIG. 8.

FIG. 8 illustrates an example local oscillator circuit 702 for supporting proximity detection 128 and wireless communication 130. In the depicted configuration, the local oscillator circuit 702 includes a frequency-modulated local oscillator 802, a local oscillator 804, and a selection circuit 806. The frequency-modulated local oscillator 802 can be implemented using a voltage ramp generator 810 and a voltage-controlled oscillator 812. As an example, the voltage-controlled oscillator 812 can be implemented using a wideband open-loop voltage-controlled oscillator. By controlling an input voltage to the voltage-controlled oscillator 812, the voltage ramp generator 810 can provide a variety of different voltage ramps to enable the voltage-controlled oscillator 812 to generate a variety of different frequency-modulated local oscillator signals 814 (e.g., a linear-frequency modulated (LFM) signal, a sawtooth-frequency modulated signal, a triangular-frequency modulated signal, and so forth). The frequency-modulated local oscillator signals 814 can have the multiple cycles 402 described with respect to FIGS. 4 and 5.

The local oscillator 804 can include, for example, a quartz crystal, an inductor-capacitor (LC) oscillator, an oscillator transistor (e.g., a metal-oxide semiconductor field-effective transistor (MOSFET), a transmission line, a diode, a piezo-electric oscillator, and so forth. A configuration of the local oscillator 804 can enable a target phase noise and quality factor to be achieved for wireless communication 130. In general, the local oscillator 804 generates a local oscillator signal 816 (LO signal 816) with a (selectable) steady (e.g., constant) frequency. Although not explicitly shown, the local oscillator circuit 702 can also include a phase lock loop or automatic gain control circuit. Either of these components can be coupled to the local oscillator 804 to enable the local oscillator 804 to oscillate at a steady frequency.

The selection circuit 806 can include a switch or a multiplexer that is controlled by the modem 122. Based on the control signal 608, the selection circuit 806 connects or disconnects the frequency-modulated local oscillator 802 or the local oscillator 804 to or from the mixers 704 and 710. If the control signal 608 is indicative of the wireless transceiver 120 performing proximity detection 128, the selection circuit 806 connects the frequency-modulated local oscillator 802 to the mixers 704 and 710 to provide the frequency-modulated local oscillator signal 814 as the reference signal 712. Alternatively, if the control signal 608 is indicative of the wireless transceiver 120 performing wireless communication 130, the selection circuit 806 connects the local oscillator 804 to the mixers 704 and 710 to provide the local oscillator signal 816 as the reference signal 712. The selection circuit 806 enables the wireless transceiver 120 to quickly transition between performing operations for proximity detection 128 or wireless communication 130.

Although the frequency-modulated local oscillator 802 and the selection circuit 806 are shown in FIG. 8, other implementations of the local oscillator circuit 702 may not include these components. In this case, the local oscillator

804 can provide the local oscillator signal 816 as the reference signal 712 for both proximity detection 128 and wireless communication 130. In this case, the modem 122 (or a signal generator within the wireless transceiver 120) can apply a frequency modulation to the baseband signal 606 to enable proximity detection 128. Aspects of proximity detection 128 are further described with respect to FIG. 9.

Figure 9:
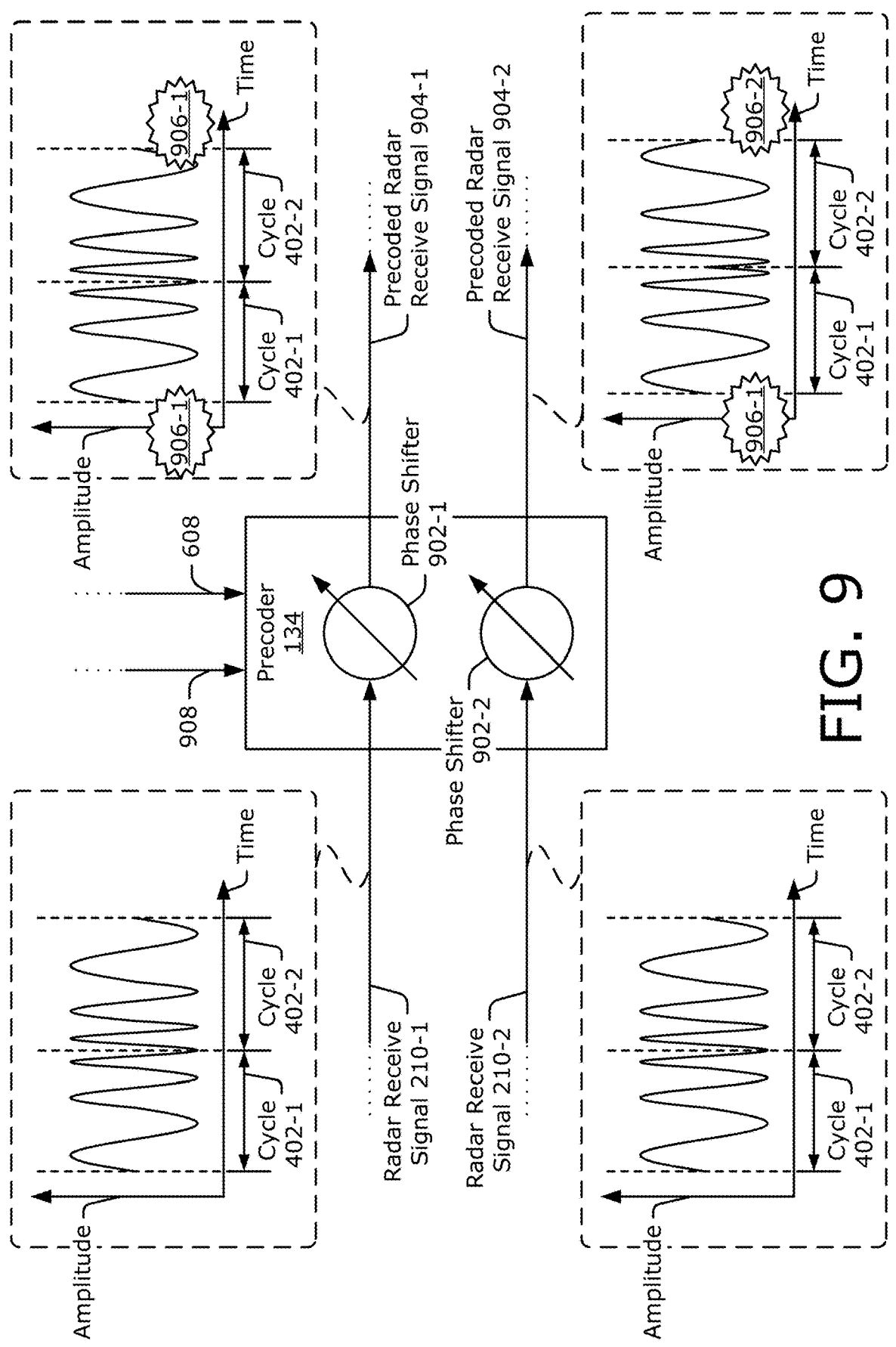
FIG. 9 illustrates an example operation of a precoder to perform aspects of precoding radar receive signals.

FIG. 9 illustrates an example operation of the precoder 134 for precoding radar receive signals. In the depicted configuration, the precoder 134 is implemented using multiple phase shifters 902-1 and 902-2. Although the precoder 134 is shown with two phase shifters 902-1 and 902-2 in this example, the precoder 134 can generally have M phase shifters, which correspond to the M receive antennas 718. Each of the phase shifters 902-1 and 902-2 is disposed in a corresponding receive chain of the receiver 604 and is associated with one of the receive antennas 718. In general, the phase shifters 902-1 and 902-2 shift the phases of the radio-frequency signals 614-1 and 614-2 based on the control signal 608 during proximity detection 128 and/or wireless communication 130. During wireless communication 130, the control signal 608 specifies phase shifts for analog beamforming. In this case, each of the phase shifters 902-1 and 902-2 shift the phase of a corresponding receive signal once by a particular amount.

During proximity detection 128, the control signal 608 includes a codebook for precoding the radar receive signals 210-1 and 210-2. The codebook can include a precoding matrix, which represents a set of orthogonal codes, such as Walsh codes. Other types of orthogonal codes are also possible. To precode the radar receive signals 210-1 and 210-2, the phase shifters 902-1 and 902-2 apply phase shifts across each of the cycles 402. In other words, each of the phase shifters 902-1 and 902-2 shift the phase of a corresponding radar receive signal 210-1 and 210-2 multiple times (e.g., once for each cycle 402).

Consider an example in which the computing device 102 transmits a radar transmit signal 208 having two cycles 402-1 and 402-2 and receives two radar receive signals 210-1 and 210-2 using two antennas 124 (e.g., antennas 718-1 and 718-M in FIG. 7). The radar receive signals 210-1 and 210-2 include the two cycles 402-1 and 402-2. During the first cycle 402-1, the frequencies of the radar receive signals 210-1 and 210-2 increase over time based on the frequency-modulation scheme 404-1. During the second cycle 402-2, the frequencies of the radar receive signals 210-1 and 210-2 decrease over time based on the frequency modulation schemes 404-2. For proximity detection 128, the phase-shifted signals 714 are represented by precoded radar receive signals 904-1 and 904-2.

To precode the radar receive signals 210-1 and 210-2, the phase shifters 902-1 to 902-2 shift the phase of the cycles 402-1 and 402-2 in a manner that causes the resulting phase-shifted signals 714-1 to 714-2 to be orthogonal. In this case, the control signal 608 can provide Walsh codes [1, 1] to the phase shifter 902-1 and Walsh codes [1, −1] to the phase shifter 902-2. The "1" value represents a zero-degree phase shift and the value "−1" represents a 180-degree phase shift. Other types of orthogonal codes can use other types of values, such as zero, to represent a particular phase shift.

Based on the control signal 608, the phase shifter 902-1 applies a first phase shift 906-1 to the first and second cycles 402-1 and 402-2 of the radar receive signal 210-1 to generate the precoded radar receive signal 904-1. In this example, the first phase shift 906-1 represents a zero-degree phase shift. As such, the precoded radar receive signal 904-1 is substantially the same as the radar receive signal 210-1.

The control signal 608 also causes the phase shifter 902-2 to apply the first phase shift 906-1 to the first cycle 402-1 of the radar receive signal 210-2 and apply a second phase shift 906-2 to the second cycle 402-2 of the radar receive signal 210-2 to generate the precoded radar receive signal 904-2. The second phase shift 906-2 is offset from the first phase shift 906-1 by approximately 180 degrees (e.g., within ±0.5 degrees of 180 degrees). With this precoding, the precoded radar receive signals 904-1 and 904-2 are substantially orthogonal to each other.

In some implementations, a timing at which the precoder 134 applies the precoding is based on a timing of the radar transmit signal 208. For example, the precoder 134 can apply the precoding based on a time the radar transmit signal 208 is transmitted and a round-trip time delay associated with a particular detection range for observing objects 206 or 218. The timing of the precoding can also be based on delays associated with the computing device 102 (e.g., propagation delays within the wireless transceiver 120). In other implementations, a timing at which the precoder 134 applies the precoding can be based on other components that detect the presence or beginning of the radar receive signals 210-1 to 210-M. This precoding enables the interface circuitry 126 to pass information associated with the multiple radar receive signals 210-1 to 210-M in parallel from the radio-frequency integrated circuit 132 to the modem 122 even with a resource-constrained communication path.

The timing at which the precoder 134 initiates the precoding can be referred to as a delay 908, which represents a time period between a start of the radar transmit signal 208 and a time that the first phase shift 906-1 is applied in FIG. 9. With this delay 908, the precoder 134 can approximately apply the phase shifts 906-1 and 906-2 during time intervals that align with the cycles 402-1 and 402-2 of the radar receive signals 210-1 and 210-2 based on the start time of the radar transmit signal 208. For short distance applications, the delay 908 can be several orders of magnitude smaller than a duration of the radar transmit signal 208. For example, the delay 908 can be several nanoseconds, and the duration of the radar transmit signal 208 can be several microseconds.

In some implementations, the delay 908 represents a software programmable delay that is provided by the radio-frequency integrated circuit 132 (e.g., provided by a controller or software engine that is integrated within the radio-frequency integrated circuit 132). Other implementations are also possible in which the modem 122 provides the delay 908 via the control signal 608. To determine the delay 908, the radio-frequency integrated circuit 132 can perform a characterization process that transmits and receives a calibration signal to measure a system delay associated with the wireless transceiver 120. The delay 908 can also be adjusted to account for one or more detection ranges associated with proximity detection 128. However, this may not be necessary for proximity detection 128 performed across short detection ranges. Although the precoder 134 in FIG. 9 is shown to precode two radar receive signals 210-1 and 210-2, the techniques for precoding radar receive signals can be applied to any quantity of radar receive signals 210 (e.g., three, four, six, twelve, or more).

FIG. 10 is a flow diagram illustrating an example process 1000 for precoding radar receive signals. The process 1000 is described in the form of a set of blocks 1002-1006 that specify operations that can be performed. However, operations are not necessarily limited to the order shown in FIG. 10 or described herein, for the operations may be implemented in alternative orders or in fully or partially overlapping manners. Operations represented by the illustrated blocks of the process 1000 may be performed by a wireless transceiver 120 (e.g., of FIG. 1, 6, or 7). More specifically, the operations of the process 1000 may be performed by a radio-frequency integrated circuit 132 (e.g., of FIG. 1, 6, or 7) or at least partially by a precoder 134 (e.g., of FIG. 1 or 9).

At block 1002, a radar transmit signal is transmitted using at least one antenna. The radar transmit signal is modulated in frequency across multiple cycles based on one of more frequency-modulation schemes. For example, the wireless transceiver 120 transmits the radar transmit signal 208 using at least one antenna 124 (e.g., antenna 716), as shown in FIGS. 2 and 7. The radar transmit signal 208 is modulated in frequency across multiple cycles 402 based on one or more frequency-modulation schemes 404, as shown in FIG. 4. Example radar transmit signals 208 can have two, three, four or more cycles 402. In general, the quantity of cycles 402 within the radar transmit signal 208 is equal to or more than a quantity of antennas 124 that receive the radar receive signals 210 to enable precoding. In other words, the quantity of cycles 402 equals the quantity of receive antennas 718-1 to 718-M in some examples, or the quantity of cycles 402 is greater than the quantity of receive antennas 718-1 to 718-M in other examples.

Each cycle 402 is associated with a particular frequency-modulation scheme 404. Some radar transmit signals 208 can have multiple cycles 402 associated with a same frequency-modulation scheme 404, such as the radar transmit signal 208-3 of FIG. 5. Other radar transmit signals 208 can have multiple cycles 402 associated with different frequency-modulation schemes 404, such as the radar transmit signal 208-1 of FIG. 5. Still other radar transmit signals 208 can have some cycles 402 associated with a same frequency-modulation scheme and other cycles 402 associated with a different frequency-modulation scheme, such as the radar transmit signal 208-2 of FIG. 5.

At block 1004, at least two radar receive signals are received using at least two other antennas. The at least two radar receive signals comprise versions of the radar transmit signal that are reflected by at least one object. Each of the at least two radar receive signals are modulated in frequency across the multiple cycles based on the one or more frequency-modulation schemes of the radar transmit signal. For example, the wireless transceiver 120 receives the at least two radar receive signals 210-1 to 210-M (represented by radio-frequency signals 614-1 to 614-M) using at least two other antennas 718, as shown in FIG. 7. The at least two radar receive signals 210-1 to 210-M comprise versions of the radar transmit signal 208 that are reflected by at least one object 206 or 218, as shown in FIG. 2. Each of the at least two radar receive signals 210-1 to 210-M are modulated in frequency across the multiple cycles 402 based on the one or more frequency-modulation schemes 404 of the radar transmit signal 208, as shown in FIG. 9.

At block 1006, the at least two radar receive signals are precoded across the multiple cycles to generate precoded radar receive signals that are orthogonal to each other. For example, the precoder 134 precodes the at least two radar receive signals 210-1 to 210-M across the multiple cycles 402-1 to 402-M to generate precoded radar receive signals 904-1 to 904-M that are orthogonal to each other, as described with respect to FIG. 9. The precoding can be performed based on a codebook provided by the modem 122 via the control signal 608. In some implementations, the precoder 134 is implemented using multiple phase shifters 902.

With the precoded radar receive signals 904-1 to 904-M, angular information about an object can be preserved prior to combining the precoded radar receive signals 904-1 to 904-M together for propagation across a resource-constrained interface. By preserving this information across the resource-constrained interface, an angular position of the object can be measured downstream using digital beamforming techniques. The angular position of the object can be used to improve beam management operation and optimize coverage for wireless communication. Additionally or alternatively, the angular position of the object can be used to meet safety guidelines promulgated by the government or the wireless industry, such as the Maximum Permitted Exposure (MPE) limit as determined by the Federal Communications Commission (FCC).

Some aspects are described below.

Aspect 1: An apparatus comprising:
a wireless transceiver configured to:
be coupled to at least three antennas;
transmit a radar transmit signal using at least one antenna of the at least three antennas, the radar transmit signal modulated in frequency across multiple cycles based on one or more frequency-modulation schemes;
receive at least two radar receive signals using at least two other antennas of the at least three antennas, the at least two radar receive signals comprising versions of the radar transmit signal that are reflected by at least one object, each of the at least two radar receive signals modulated in frequency across the multiple cycles based on the one or more frequency-modulation schemes of the radar transmit signal; and
precode at least two radar receive signals across the multiple cycles to generate precoded radar receive signals that are orthogonal to each other.

Aspect 2: The apparatus of aspect 1, wherein a quantity of the multiple cycles is equal to a quantity of the at least two other antennas.

Aspect 3: The apparatus of any preceding aspect, wherein:
the wireless transceiver comprises at least two phase shifters configured to be respectively coupled to the at least two other antennas; and
the at least two phase shifters are configured to precode the multiple cycles of the at least two radar receive signals to generate the precoded radar receive signals.

Aspect 4: The apparatus of aspect 3, wherein:
the at least two radar receive signals comprise a first radar receive signal and a second radar receive signal;
the multiple cycles comprise a first cycle and a second cycle; and
the at least two phase shifters comprise:
a first phase shifter configured to apply a first phase shift to the first and second cycles of the first radar receive signal; and
a second phase shifter configured to:
apply the first phase shift to the first cycle of the second radar receive signal; and
apply a second phase shift to the second cycle of the second radar receive signal, the second phase shift being offset from the first phase shift by approximately 180 degrees.

Aspect 5: The apparatus of aspect 4, wherein the first phase shifter and the second phase shifter are jointly configured to apply the first phase shift based on a delay relative to transmission of the radar transmit signal.

Aspect 6: The apparatus of aspect 5, wherein the delay comprises a software programmable delay.

Aspect 7: The apparatus of aspect 4, wherein the first phase shift is approximately zero degrees.

Aspect 8: The apparatus of any preceding aspect, wherein:
the one or more frequency-modulation schemes comprise:
a first frequency-modulation scheme; and
a second frequency-modulation scheme that differs from the first frequency-modulation scheme; and
the multiple cycles comprise:
a first cycle having the first frequency-modulation scheme; and
a second cycle having the second frequency-modulation scheme.

Aspect 9: The apparatus of aspect 8, wherein:
the first frequency-modulation scheme increases frequency over time; and
the second frequency-modulation scheme decreases frequency over time.

Aspect 10: The apparatus of any preceding aspect, wherein the one or more frequency-modulation schemes comprise a single frequency-modulation scheme.

Aspect 11: The apparatus of aspect 10, wherein the single frequency-modulation scheme increases or decreases frequency over time.

Aspect 12: The apparatus of any preceding aspect, wherein the wireless transceiver comprises:
a radio-frequency integrated circuit comprising:
a precoder configured to precode the multiple cycles of the at least two radar receive signals to generate the precoded radar receive signals; and
a combiner configured to generate a composite radar receive signal based on the precoded radar receive signals; and
interface circuitry configured to:
couple the radio-frequency integrated circuit to a modem; and
pass the composite radar receive signal to the modem.

Aspect 13: The apparatus of aspect 12, wherein:
the interface circuitry comprises at least one communication path coupled between the radio-frequency integrated circuit and the modem; and
a quantity of the at least two radar receive signals is greater than a quantity of paths in the at least one communication path.

Aspect 14: The apparatus of aspect 12 or 13, further comprising:
the modem, the modem comprising:
a decoder configured to extract versions of the at least two radar receive signals from the composite radar receive signal; and
a digital beamformer configured to generate a spatial response that indicates an angular position of the at least one object based on the extracted versions of the at least two radar receive signals.

Aspect 15: A method comprising:
transmitting a radar transmit signal using at least one antenna, the radar transmit signal modulated in frequency across multiple cycles based on one or more frequency-modulation schemes;
receiving at least two radar receive signals using at least two other antennas, the at least two radar receive signals comprising versions of the radar transmit signal that are reflected by at least one object, each of the at least two radar receive signals modulated in frequency across the multiple cycles based on the one or more frequency-modulation schemes of the radar transmit signal; and precoding the multiple cycles of the at least two radar receive signals to generate precoded radar receive signals that are orthogonal to each other.

Aspect 16: The method of aspect 15, wherein the precoding comprises precoding the multiple cycles of the at least two radar receive signals prior to downconverting versions of the at least two radar receive signals.

Aspect 17: The method of aspect 15 or 16, wherein: the at least two radar receive signals comprise a first radar receive signal and a second radar receive signal; the multiple cycles comprise a first cycle and a second cycle; and the precoding comprises:

applying a first phase shift to the first and second cycles of the first radar receive signal;

applying the first phase shift to the first cycle of the second radar receive signal; and applying a second phase shift to the second cycle of the second radar receive signal, the second phase shift being offset from the first phase shift by approximately 180 degrees.

Aspect 18: The method of any one of aspects 15 to 17, further comprising:

generating a composite radar receive signal based on the precoded radar receive signals; and passing the composite radar receive signal to a modem across at least one communication path.

Aspect 19: The method of aspect 18, wherein a quantity of the at least two radar receive signals is greater than a quantity of paths in the at least one communication path.

Aspect 20: An apparatus comprising:

means for transmitting a radar transmit signal, the radar transmit signal modulated in frequency across multiple cycles based on one or more frequency-modulation schemes;

means for receiving at least two radar receive signals comprising versions of the radar transmit signal that are reflected by at least one object, each of the at least two radar receive signals modulated in frequency across the multiple cycles based on the one or more frequency-modulation schemes of the radar transmit signal; and means for precoding the at least two radar receive signals across the multiple cycles to generate precoded radar receive signals that are orthogonal to each other.

Aspect 21: The apparatus of aspect 20, wherein the means for precoding comprises means for applying phase shifts to the multiple cycles of the at least two radar receive signals.

Aspect 22: The apparatus of any one of aspects 20 to 22, further comprising means for generating a composite radar receive signal based on the precoded radar receive signals.

Aspect 23: The apparatus of aspect 22, further comprising:

means for passing the composite radar receive signal to a modem across at least one communication path, wherein a quantity of the at least two radar receive signals is greater than a quantity of paths in the at least one communication path.

Aspect 24: A radio-frequency integrated circuit configured to:

be coupled to multiple antennas; and receive multiple radar receive signals via the multiple antennas, each radar receive signal of the multiple radar receive signals modulated in frequency across multiple cycles based on one or more frequency-modulation schemes, the radio-frequency integrated circuit comprising:

multiple phase shifters configured to apply multiple phase shifts across the multiple cycles of the multiple radar receive signals to generate precoded radar receive signals that are orthogonal to each other; and at least one combiner configured to:

be coupled between the multiple phase shifters and a mixer; and generate a composite radar receive signal based on the precoded radar receive signals.

Aspect 25: The radio-frequency integrated circuit of aspect 24, wherein a quantity of the multiple cycles is equal to a quantity of the multiple antennas.

Aspect 26: The radio-frequency integrated circuit of aspect 24 or 25, wherein the radio-frequency integrated circuit is configured to:

be coupled to interface circuitry; and transmit the composite radar receive signal to a modem via the interface circuitry.

Aspect 27: The radio-frequency integrated circuit of aspect 26, wherein a quantity of the multiple radar receive signals is greater than a quantity of paths in at least one communication path of the interface circuitry.

Aspect 28: The radio-frequency integrated circuit of any one of aspects 24 to 27, wherein:

the radio-frequency integrated circuit comprises the mixer; and the mixer is configured to downconvert the composite radar receive signal.

Aspect 29: The radio-frequency integrated circuit of any one of aspects 24 to 28, wherein:

the multiple radar receive signals comprise a first radar receive signal and a second radar receive signal;

the multiple cycles comprise a first cycle and a second cycle; and the multiple phase shifters comprise:

a first phase shifter configured to apply a first phase shift of the multiple phase shifts to the first and second cycles of the first radar receive signal; and a second phase shifter configured to:

apply the first phase shift to the first cycle of the second radar receive signal; and apply a second phase shift to the second cycle of the second radar receive signal, the second phase shift being offset from the first phase shift by approximately 180 degrees.

Aspect 30: The radio-frequency integrated circuit of aspect 29, wherein the one or more frequency-modulation schemes comprise:

a first frequency-modulation scheme that increases frequency over time; and a second frequency-modulation scheme that decreases frequency over time.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). Further, items represented in the accompanying figures and terms discussed herein may be indicative of one or more items or terms, and thus reference may be made interchangeably to single or plural forms of the items and terms in this written description. Finally, although subject matter has been described in language specific to structural features or methodological operations, it is to be understood that the subject matter defined in the appended claims is not necessarily limited to the specific features or operations described above, including not necessarily being limited to the organizations in which features are arranged or the orders in which operations are performed.

What is claimed is:

1. An apparatus comprising:
a wireless transceiver configured to:
be coupled to at least three antennas;
transmit a radar transmit signal using at least one antenna of the at least three antennas, the radar transmit signal modulated in frequency across multiple cycles based on one or more different frequency-modulation schemes;
receive at least two radar receive signals using at least two other antennas of the at least three antennas, the at least two radar receive signals comprising versions of the radar transmit signal that are reflected by at least one object, each of the at least two radar receive signals modulated in frequency across the multiple cycles based on the one or more frequency-modulation schemes of the radar transmit signal; and
precode at least two radar receive signals across the multiple cycles to generate precoded radar receive signals that are orthogonal to each other,
wherein the wireless transceiver comprises:
a precoder configured to precode the multiple cycles of the at least two radar receive signals to generate the precoded radar receive signals; and
a combiner configured to generate a composite radar receive signal based on the precoded radar receive signals by combining the precoded radar receive signals; and
interface circuitry configured to:
couple the radio-frequency integrated circuit to a modem; and
pass the composite radar receive signal to the modem,
wherein the interface circuitry comprises at least one communication path coupled between the radio-frequency integrated circuit and the modem; and
a quantity of the at least two radar receive signals is greater than a quantity of paths in the at least one communication path.

2. The apparatus of claim 1, wherein a quantity of the multiple cycles is equal to a quantity of the at least two other antennas.

3. The apparatus of claim 1, wherein:
the wireless transceiver comprises at least two phase shifters configured to be respectively coupled to the at least two other antennas; and
the at least two phase shifters are configured to precode the multiple cycles of the at least two radar receive signals to generate the precoded radar receive signals.

4. The apparatus of claim 3, wherein:
the at least two radar receive signals comprise a first radar receive signal and a second radar receive signal;
the multiple cycles comprise a first cycle and a second cycle; and the at least two phase shifters comprise:
a first phase shifter configured to apply a first phase shift to the first and second cycles of the first radar receive signal; and
a second phase shifter configured to:
apply the first phase shift to the first cycle of the second radar receive signal; and
apply a second phase shift to the second cycle of the second radar receive signal, the second phase shift being offset from the first phase shift by approximately 180 degrees.

5. The apparatus of claim 4, wherein the first phase shifter and the second phase shifter are jointly configured to apply the first phase shift based on a delay relative to transmission of the radar transmit signal.

6. The apparatus of claim 5, wherein the delay comprises a software programmable delay.

7. The apparatus of claim 4, wherein the first phase shift is approximately zero degrees.

8. The apparatus of claim 1, wherein:
the one or more frequency-modulation schemes comprise:
a first frequency-modulation scheme; and
a second frequency-modulation scheme that differs from the first frequency-modulation scheme; and
the multiple cycles comprise:
a first cycle having the first frequency-modulation scheme; and
a second cycle having the second frequency-modulation scheme.

9. The apparatus of claim 8, wherein:
the first frequency-modulation scheme increases frequency over time; and
the second frequency-modulation scheme decreases frequency over time.

10. The apparatus of claim 1, wherein the one or more frequency-modulation schemes comprise a single frequency-modulation scheme.

11. The apparatus of claim 10, wherein the single frequency-modulation scheme increases or decreases frequency over time.

12. The apparatus of claim 1, further comprising:
the modem, the modem comprising:
a decoder configured to extract versions of the at least two radar receive signals from the composite radar receive signal; and
a digital beamformer configured to generate a spatial response that indicates an angular position of the at least one object based on the extracted versions of the at least two radar receive signals.

13. A method comprising:
transmitting a radar transmit signal using at least one antenna, the radar transmit signal modulated in frequency across multiple cycles based on one or more different frequency-modulation schemes;
receiving at least two radar receive signals using at least two other antennas, the at least two radar receive signals comprising versions of the radar transmit signal that are reflected by at least one object, each of the at least two radar receive signals modulated in frequency across the multiple cycles based on the one or more frequency-modulation schemes of the radar transmit signal;
precoding the multiple cycles of the at least two radar receive signals to generate precoded radar receive signals that are orthogonal to each other;

generating a composite radar receive signal based on the precoded radar receive signals by combining the precoded radar receive signals; and passing the composite radar receive signal to a modem across at least one communication path, wherein a quantity of the at least two radar receive signals is greater than a quantity of paths in the at least one communication path.

14. The method of claim 13, wherein the precoding comprises precoding the multiple cycles of the at least two radar receive signals prior to downconverting versions of the at least two radar receive signals.

15. The method of claim 13, wherein:

the at least two radar receive signals comprise a first radar receive signal and a second radar receive signal;

the multiple cycles comprise a first cycle and a second cycle; and the precoding comprises:

applying a first phase shift to the first and second cycles of the first radar receive signal;

applying the first phase shift to the first cycle of the second radar receive signal; and applying a second phase shift to the second cycle of the second radar receive signal, the second phase shift being offset from the first phase shift by approximately 180 degrees.

16. An apparatus comprising:

means for transmitting a radar transmit signal, the radar transmit signal modulated in frequency across multiple cycles based on one or more different frequency-modulation schemes;

means for receiving at least two radar receive signals comprising versions of the radar transmit signal that are reflected by at least one object, each of the at least two radar receive signals modulated in frequency across the multiple cycles based on the one or more frequency-modulation schemes of the radar transmit signal;

means for precoding the at least two radar receive signals across the multiple cycles to generate precoded radar receive signals that are orthogonal to each other;

means for generating a composite radar receive signal based on the precoded radar receive signals by combining the precoded radar receive signals; and means for passing the composite radar receive signal to a modem across at least one communication path, wherein a quantity of the at least two radar receive signals is greater than a quantity of paths in the at least one communication path.

17. The apparatus of claim 16, wherein the means for precoding comprises means for applying phase shifts to the multiple cycles of the at least two radar receive signals.

18. A radio-frequency integrated circuit configured to:

be coupled to multiple antennas; and receive multiple radar receive signals via the multiple antennas, each radar receive signal of the multiple radar receive signals modulated in frequency across multiple cycles based on one or more different frequency-modulation schemes, the radio-frequency integrated circuit comprising:

multiple phase shifters configured to apply multiple phase shifts across the multiple cycles of the multiple radar receive signals to generate precoded radar receive signals that are orthogonal to each other; and at least one combiner configured to:

be coupled between the multiple phase shifters and a mixer; and generate a composite radar receive signal based on the precoded radar receive signals by combining the precoded radar receive signals, wherein the radio-frequency integrated circuit is configured to be coupled to interface circuitry and to transmit the composite radar receive signal to a modem via the interface circuitry, wherein a quantity of the multiple radar receive signals is greater than a quantity of paths in at least one communication path of the interface circuitry.

19. The radio-frequency integrated circuit of claim 18, wherein a quantity of the multiple cycles is equal to a quantity of the multiple antennas.

20. The radio-frequency integrated circuit of claim 18, wherein:

the radio-frequency integrated circuit comprises the mixer; and the mixer is configured to downconvert the composite radar receive signal.

21. The radio-frequency integrated circuit of claim 18, wherein:

the multiple radar receive signals comprise a first radar receive signal and a second radar receive signal;

the multiple cycles comprise a first cycle and a second cycle; and the multiple phase shifters comprise:

a first phase shifter configured to apply a first phase shift of the multiple phase shifts to the first and second cycles of the first radar receive signal; and a second phase shifter configured to:

apply the first phase shift to the first cycle of the second radar receive signal; and apply a second phase shift to the second cycle of the second radar receive signal, the second phase shift being offset from the first phase shift by approximately 180 degrees.

22. The radio-frequency integrated circuit of claim 21, wherein the one or more frequency-modulation schemes comprise:

a first frequency-modulation scheme that increases frequency over time; and a second frequency-modulation scheme that decreases frequency over time.

* * * * *